United States Patent
Tsukamoto

(10) Patent No.: US 10,399,446 B2
(45) Date of Patent: Sep. 3, 2019

(54) WIRELESS POWER SUPPLY SYSTEM AND WIRELESS POWER RECEPTION DEVICE

(71) Applicant: NISSAN MOTOR CO., LTD., Yokohama-shi, Kanagawa (JP)

(72) Inventor: Yukinori Tsukamoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/302,038

(22) PCT Filed: Apr. 8, 2014

(86) PCT No.: PCT/JP2014/060201
§ 371 (c)(1),
(2) Date: Oct. 5, 2016

(87) PCT Pub. No.: WO2015/155838
PCT Pub. Date: Oct. 15, 2015

(65) Prior Publication Data
US 2017/0113557 A1    Apr. 27, 2017

(51) Int. Cl.
*B60L 11/18* (2006.01)
*H02J 50/40* (2016.01)
*H02J 50/10* (2016.01)
*H02J 7/00* (2006.01)
*H02J 17/00* (2006.01)
(Continued)

(52) U.S. Cl.
CPC ............ *B60L 11/182* (2013.01); *B60L 50/50* (2019.02); *B60L 53/12* (2019.02); *B60L 53/30* (2019.02); *H02J 7/00* (2013.01); *H02J 7/0027* (2013.01); *H02J 7/025* (2013.01); *H02J 17/00* (2013.01); *H02J 50/10* (2016.02); *H02J 50/40* (2016.02);
(Continued)

(58) Field of Classification Search
CPC .... B60L 11/18; B60L 11/182; B60L 11/1824; H02J 50/10; H02J 50/40
USPC .......................................... 320/108
See application file for complete search history.

(56) References Cited

U.S. PATENT DOCUMENTS 6,525,996 B1    2/2003  Miyazawa
9,178,361 B2 *  11/2015  Liu ..................... H02J 5/005
(Continued)

FOREIGN PATENT DOCUMENTS

FR    2996372 A1    4/2014
JP    2002-142388 A    5/2002
(Continued)

*Primary Examiner* — Richard Isla
*Assistant Examiner* — Dung V Bui
(74) *Attorney, Agent, or Firm* — Foley & Lardner LLP

(57) ABSTRACT

When a vehicle approaches a parking space, a ground controller sets a power transmission coil to first excitation in which the power transmission coil is excited in an excitation pattern containing identification data. A vehicle controller pre-charges a capacitor connected to a power reception coil after the vehicle approaches the parking space. Further, the vehicle controller acquires the identification data when the power transmission coil is in the first excitation, and transmits the acquired identification data to the ground unit. The ground controller pairs a power transmission device and a power reception device with each other if the identification data contained in the excitation pattern and the identification data acquired by the vehicle controller match each other.

10 Claims, 27 Drawing Sheets

(51) Int. Cl.
- *H02J 7/02* (2016.01)
- *H02J 50/90* (2016.01)
- *H02J 50/80* (2016.01)
- *B60L 50/50* (2019.01)
- *B60L 53/12* (2019.01)
- *B60L 53/30* (2019.01)

(52) U.S. Cl.
CPC .............. *H02J 50/80* (2016.02); *H02J 50/90* (2016.02); *Y02T 10/7055* (2013.01)

(56) References Cited

U.S. PATENT DOCUMENTS

| | | | | |
|---|---|---|---|---|
| 2009/0010035 | A1* | 1/2009 | Williams | H02M 3/158 363/131 |
| 2010/0123452 | A1* | 5/2010 | Amano | B60L 11/182 323/359 |
| 2010/0225271 | A1* | 9/2010 | Oyobe | B60L 5/005 320/108 |
| 2012/0032632 | A1* | 2/2012 | Soar | H01F 38/14 320/108 |
| 2012/0146576 | A1* | 6/2012 | Partovi | H01F 7/0252 320/108 |
| 2012/0161696 | A1* | 6/2012 | Cook | B60L 11/182 320/108 |
| 2012/0235636 | A1* | 9/2012 | Partovi | H02J 7/025 320/108 |
| 2013/0024059 | A1* | 1/2013 | Miller | H02J 50/12 701/22 |
| 2013/0038272 | A1* | 2/2013 | Sagata | B60L 11/182 320/106 |
| 2013/0062965 | A1* | 3/2013 | Chernokalov | H04B 5/0037 307/104 |
| 2013/0076296 | A1* | 3/2013 | Ushiroda | B60L 3/12 320/101 |
| 2013/0119929 | A1 | 5/2013 | Partovi | |
| 2013/0154553 | A1* | 6/2013 | Steele | B60L 11/182 320/108 |
| 2013/0181669 | A1 | 7/2013 | Kawasaki | |
| 2013/0214591 | A1* | 8/2013 | Miller | H02J 5/005 307/9.1 |
| 2013/0300204 | A1* | 11/2013 | Partovi | H01F 38/14 307/104 |
| 2014/0021916 | A1* | 1/2014 | Bilezikjian | B60L 3/0046 320/109 |
| 2014/0035522 | A1 | 2/2014 | Oishi | |
| 2015/0115704 | A1 | 4/2015 | Gorai et al. | |
| 2015/0274023 | A1 | 10/2015 | Houivet et al. | |

FOREIGN PATENT DOCUMENTS

| | | |
|---|---|---|
| JP | 2013-240130 A | 11/2013 |
| WO | WO 2012/042902 A1 | 4/2012 |
| WO | WO 2012/086048 A1 | 6/2012 |
| WO | WO 2012/111127 A1 | 8/2012 |
| WO | WO 2013/168281 A1 | 11/2013 |

\* cited by examiner

EXAMPLE OF TRANSMITTED DATA

| START BIT | ID | DATA-LENGTH CODE | IDENTIFICATION DATA | SUM VALUE | STOP BIT |
|---|---|---|---|---|---|

FIG. 15
(a) VOLTAGE FOR EXCITATION OF POWER TRANSMISSION COIL
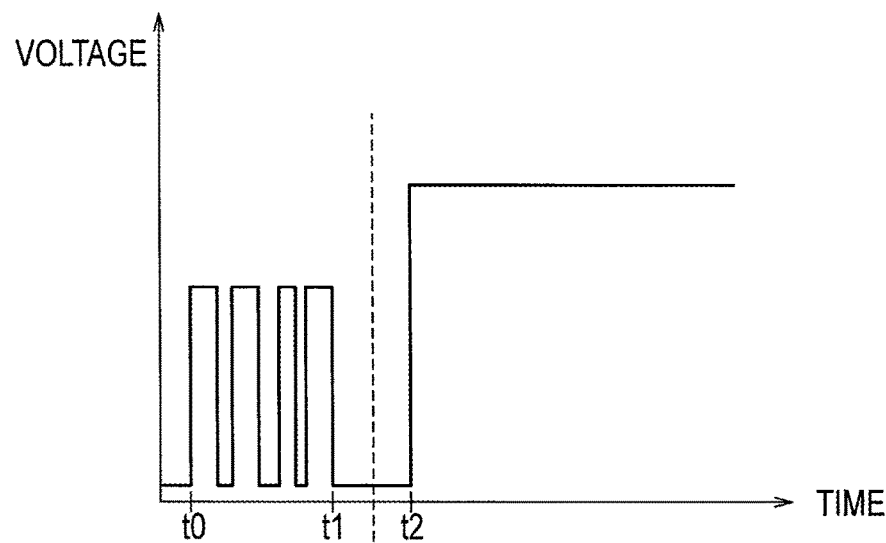
(b) RECEIVED VOLTAGE
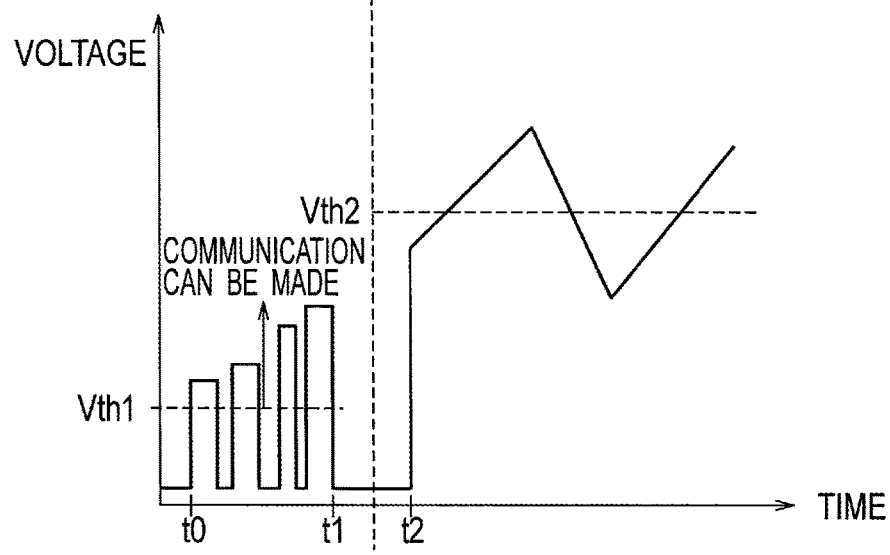

FIG. 28
(a) VOLTAGE FOR EXCITATION OF
POWER TRANSMISSION COIL
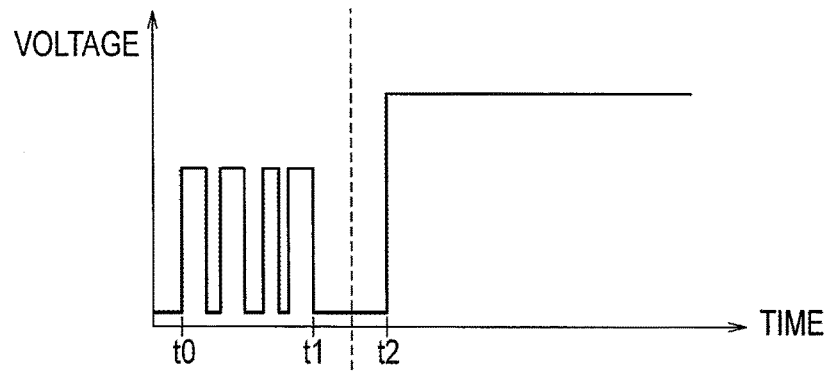
(b) COMBINED VOLTAGE
AT SC3, SC4
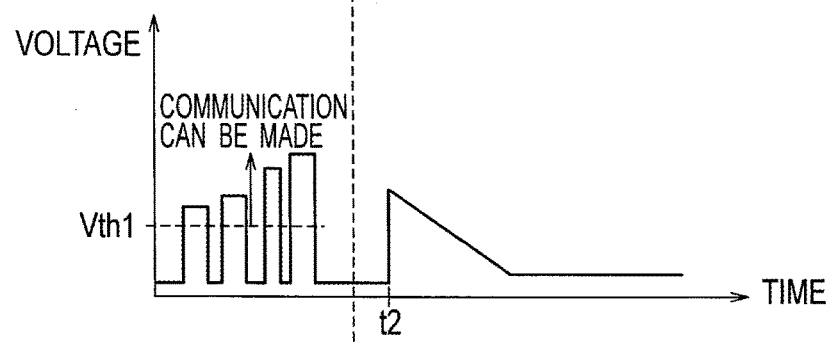
(c) VOLTAGE AT SC1
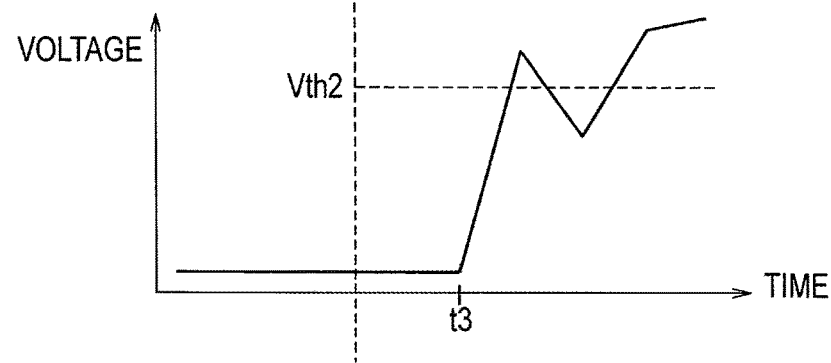

WIRELESS POWER SUPPLY SYSTEM AND WIRELESS POWER RECEPTION DEVICE

TECHNICAL FIELD

The present invention relates to a wireless power supply system and a wireless power reception device for wirelessly supplying power to a vehicle equipped with an electric load such as a battery.

BACKGROUND ART

Heretofore, a wireless charge system disclosed in Patent Literature 1 has been known which is configured to wirelessly supply power to a vehicle equipped with a battery (electric load) to charge the battery. This Patent Literature 1 discloses that, in a case where a plurality of power transmission devices are present, a power transmission coil is weakly excited to generate a random signal, which is detected by a vehicle, and the vehicle and the power transmission device are paired with each other if it is confirmed that the random signals match each other between the vehicle and the power transmission device.

CITATION LIST

Patent Literature

Patent Literature 1: International Publication No. WO2012/042902

SUMMARY OF INVENTION

However, in the configuration in the conventional example disclosed in above Patent Literature 1, in order to perform the pairing, the vehicle enters and stops in the parking space, and in this state a signal containing a random ID pattern is transmitted by the power transmission coil and received by the vehicle. For this reason, a problem arises in that it takes a long time before the vehicle starts to be actually charged after stopping in the parking space.

The present invention has been made to solve this problem in the conventional art, and an object thereof is to provide a wireless power supply system and a wireless power reception device capable of quick pairing with a vehicle entering a parking space.

A wireless power supply system according to one aspect of the present invention includes a power transmission device provided on the ground and a power reception device provided to a vehicle. The power transmission device includes a power transmission coil configured to transmit power, a power-supply control unit configured to control power to be supplied to the power transmission coil, and a power-transmission-side communication unit configured to communicate with the power reception device. Also, the power reception device includes a power reception coil configured to receive power transmitted from the power transmission coil and supply the received power to an electric load through a capacitor, a power-reception control unit configured to control power reception of the power reception coil, and a power-reception-side communication unit configured to communicate with the power transmission device. When the vehicle approaches a parking space, the power-supply control unit sets the power transmission coil to first excitation in which the power transmission coil is excited in an excitation pattern containing identification data. The power-reception control unit pre-charges the capacitor after the vehicle approaches the parking space, acquires the identification data when the power transmission coil is in the first excitation, and transmits the acquired identification data to the power transmission device. The power-supply control unit pairs the power transmission device and the power reception device with each other if the identification data contained in the excitation pattern and the identification data acquired by the power-reception control unit match each other.

A wireless power reception device according to one aspect of the present invention includes: a power reception coil configured to receive power transmitted from a power transmission device and supply the received power to an electric load through a capacitor; a power-reception control unit configured to control power reception of the power reception coil, and a power-reception-side communication unit configured to communicate with the power transmission device. The power-reception control unit pre-charges the capacitor after the vehicle approaches a parking space, acquires identification data when a power transmission coil provided to the power transmission device is being set to first excitation in which the power transmission coil is excited in an excitation pattern containing the identification data, and transmits the acquired identification data to the power transmission device.

BRIEF DESCRIPTION OF DRAWINGS

FIG. 15 is a set of waveform charts according to the first embodiment of the present invention showing voltage for excitation of the power transmission coil and voltage received by one of the subcoils.

FIG. 28 is a set of waveform charts according to the third embodiment of the present invention showing voltage for excitation of the power transmission coil and voltage received by some of the subcoils.

DESCRIPTION OF EMBODIMENTS

An embodiment of the present invention will be described below with reference to drawings.

[Description of First Embodiment]

Figure 1:
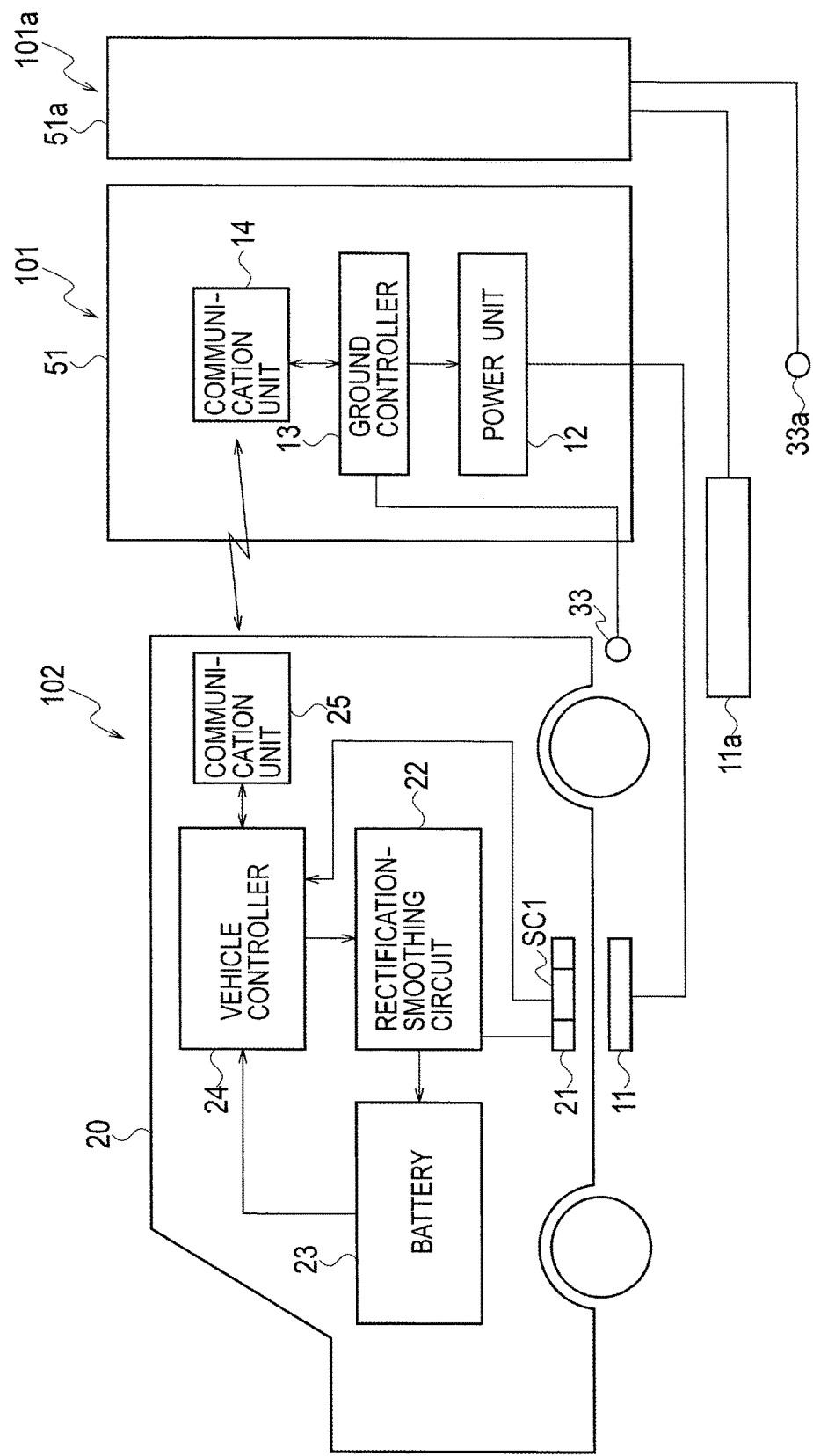
FIG. 1 is a block diagram showing the configuration of a wireless power supply system according to a first embodiment of the present invention.

FIG. 1 is a block diagram showing the configuration of a wireless power supply system according to a first embodiment of the present invention. As shown in FIG. 1, this wireless power supply system includes a plurality of power transmission devices (two power transmission devices 101, 101a are shown in FIG. 1 as an example) provided to parking equipment on the ground, and a power reception device 102 mounted on a vehicle 20.

The power transmission device 101 includes a parking space for parking the vehicle 20. The power transmission device 101 also includes a ground unit 51, a power transmission coil 11 installed on the ground of the parking space, and a vehicle detection sensor 33 configured to detect when the vehicle 20 approaches the parking space. Note that FIG. 1 shows the two power transmission devices 101, 101a as an example. The present invention is not limited to this case, but is applicable to cases where three or more power transmission devices are provided.

The ground unit 51 includes: a power unit 12 configured to excite the power transmission coil 11 by causing current to flow therethrough; a ground controller 13 (power-supply control unit) configured to control the actuation of the power unit 12; and a communication unit 14 (power-transmission-side communication unit) configured to perform wireless communication with the power reception device 102. Meanwhile, the power transmission device 101a also has a similar configuration, and includes a ground unit 51a, a power transmission coil 11a, and a vehicle detection sensor 33a. Note that the ground controller 13 can be constructed as an integrated computer including a central processing unit (CPU) and storage means such as an RAM, an ROM, and a hard disk drive, for example.

The power reception device 102, mounted on the vehicle 20, includes a power reception coil 21 installed at an appropriate position on the bottom of the vehicle 20, and a rectification-smoothing circuit 22 configured to rectify and smooth AC voltage received by the power reception coil 21. The power reception device 102 further includes a vehicle controller 24 (power-reception control unit) configured to control the actuation of the rectification-smoothing circuit 22, a battery 23 (electric load) configured to be charged with the voltage received by the power reception coil 21, and a communication unit 25 (power-reception-side communication unit) configured to communicate with the ground unit 51. The power reception coil 21 is disposed at such a position as to face the above-mentioned power transmission coil 11 when the vehicle 20 is parked at a predetermined position in the parking space. The power received by the power reception coil 21 is supplied to the battery 23. That is, the received power is supplied to the vehicle 20 as drive force.

Figure 6:
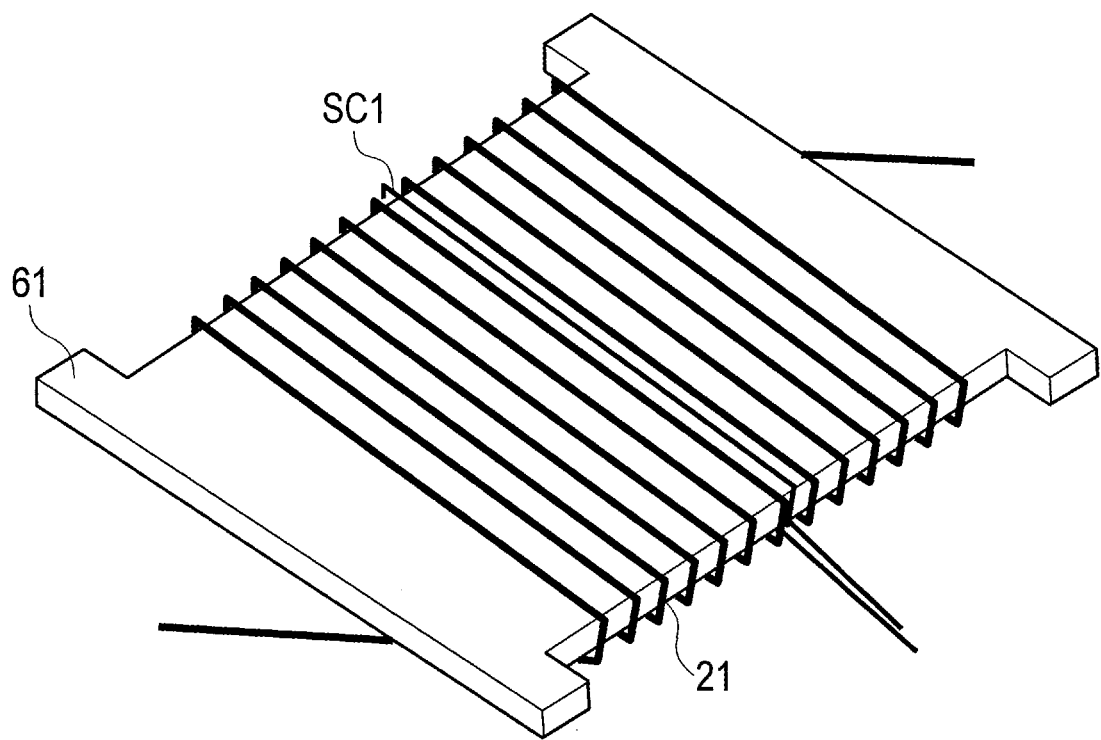
FIG. 6 is a perspective view showing the configuration of the power reception coil and one of the subcoils used in the wireless power supply system according to the first embodiment of the present invention.

As shown in FIG. 6, the power reception coil 21 is helically wound around a ferrite core 61. Further, a subcoil SC1 (central subcoil) is wound around this ferrite core 61 at its center portion. This subcoil SC1 is configured to receive an electromagnetic signal outputted from the power transmission coil 11 and output it to the vehicle controller 24 when the vehicle 20 moves and approaches the predetermined position in the parking space. Specifically, the subcoil SC1 functions as a central subcoil provided near the power reception coil 21 and configured to receive power transmitted from the power transmission coil 11. Note that the vehicle controller 24 can be constructed as an integrated computer including a central processing unit (CPU) and storage units such as an RAM, an ROM, and a hard disk drive, for example.

Figure 2:
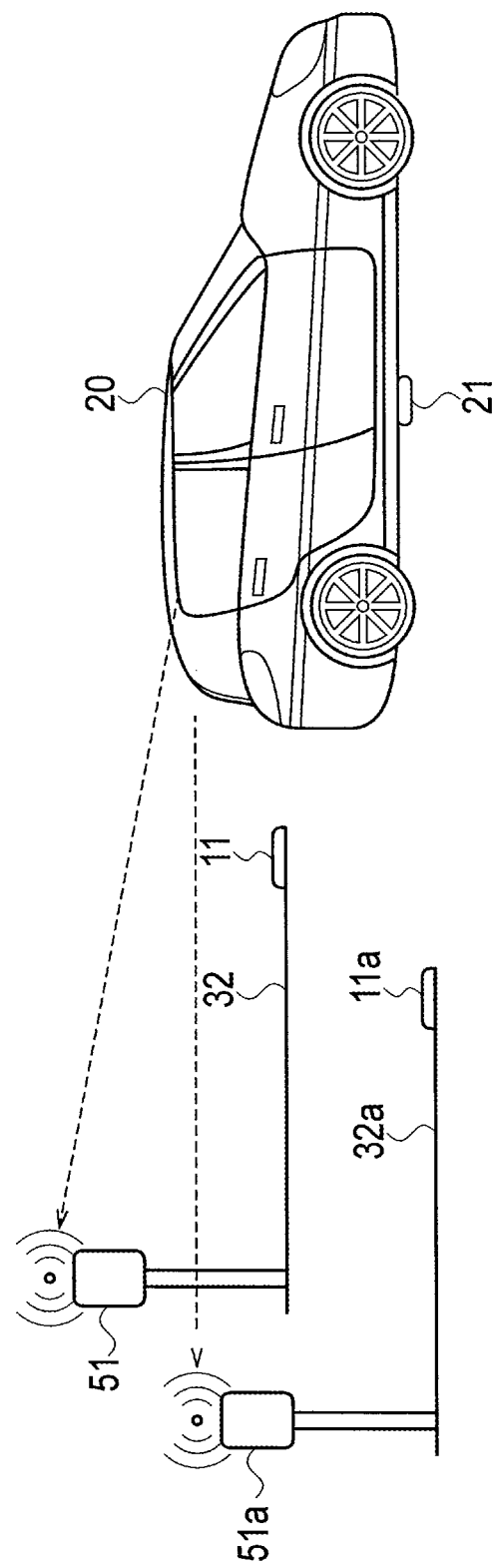
FIG. 2 is an explanatory diagram showing the relation between a vehicle and a plurality of parking spaces.

FIG. 2 is an explanatory diagram showing the relation between the vehicle 20 and a plurality of parking spaces 32, 32a. In this embodiment, a process of pairing the power reception device 102, mounted on the vehicle 20, and the power transmission device 101, corresponding to the parking space 32, at which the vehicle 20 is to be parked, is performed through wireless communication between the ground units 51, 51a, provided to at the parking spaces 32, 32a, and the power reception device 102. The power transmission coil 11 of the power transmission device 101 after being paired with the vehicle 20 is energized to transmit power. The power reception device 102 receives this power and charges the battery 23 (see FIG. 3), mounted on the vehicle 20.

Figure 3:
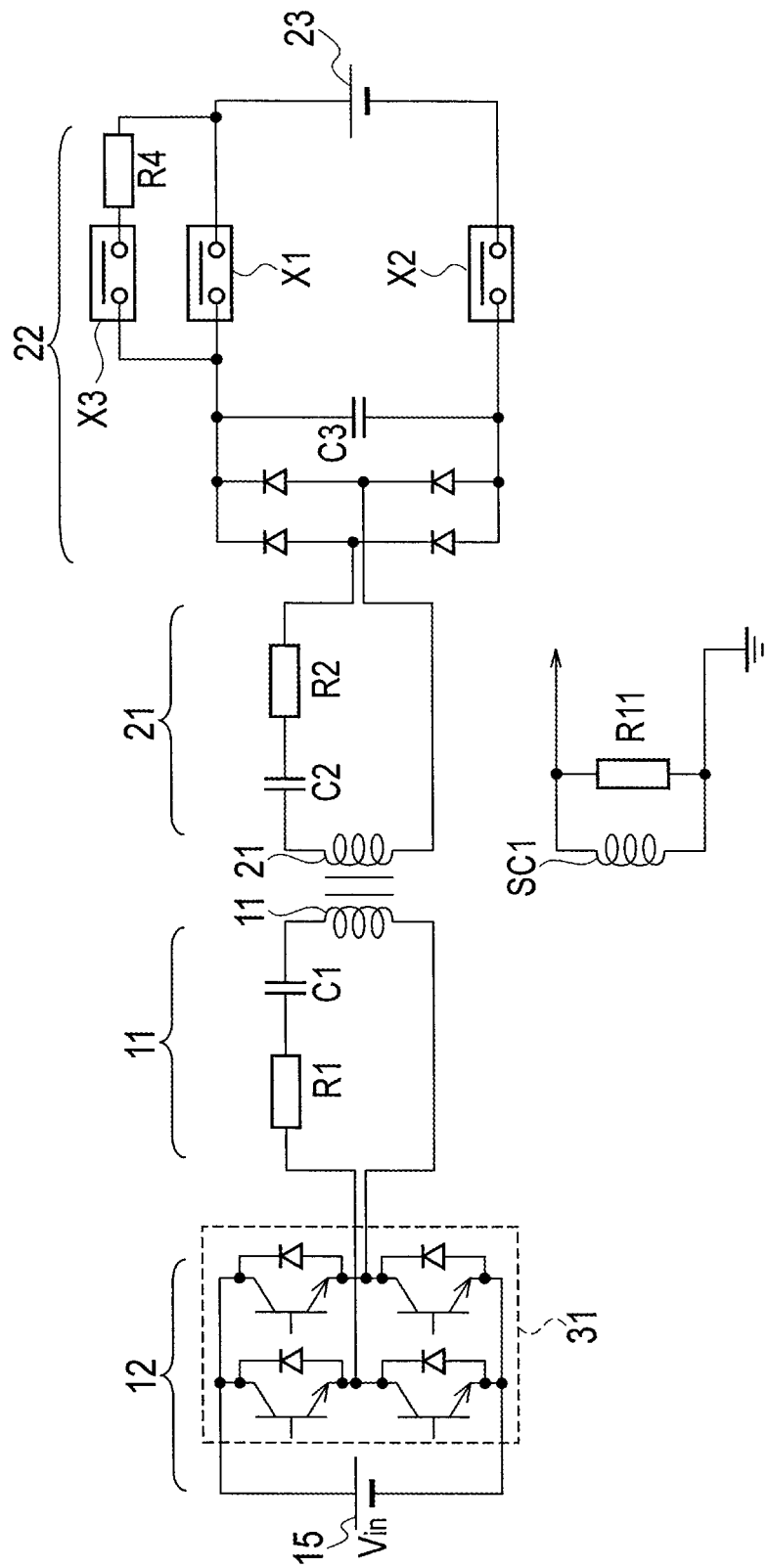
FIG. 3 is a circuit diagram of a power unit, a power transmission coil, a power reception coil, subcoils, and a rectification-smoothing circuit of the wireless power supply system according to the first embodiment of the present invention.

FIG. 3 is a circuit diagram showing detailed configurations of the power unit 12, the power transmission coil 11, the power reception coil 21, the rectification-smoothing circuit 22, and the subcoil SC1, which are shown in FIG. 1, and peripheral elements thereof. As shown in FIG. 3, the power unit 12 includes an inverter circuit 31 formed of a plurality of switch circuits (such for example as semiconductor elements). Moreover, the on and off of each switch circuit are controlled under control of the ground controller 13 (see FIG. 1) such that a DC voltage Vin supplied from a DC power source 15 is converted into an AC voltage of a predetermined frequency.

A resistor R1 and a capacitor C1 are connected to the power transmission coil 11. By applying the AC voltage outputted from the power unit 12 to the power transmission coil 11 and thereby causing a current to flow therethrough, the power transmission coil 11 can be set to one of first excitation which is excitation for pairing to be described later and second excitation which is excitation for positioning of the vehicle 20. Further, if the power transmission coil 11 and the power reception coil 21 are situated to face each other as shown in FIG. 1, the power transmission coil 11 is set to third excitation which is excitation for battery charging, to thereby transmit power for battery charging to the power reception coil 21.

The power reception coil 21 is connected to a capacitor C2 and a resistor R2, and receives the power transmitted from the power transmission coil 11. The rectification-smoothing circuit 22 includes a bridge circuit formed of a plurality of diodes, and a capacitor C3. The rectification-smoothing circuit 22 converts the AC voltage received by the power reception coil 21 into a DC voltage and further smoothes it and then supplies it to the battery 23.

Relays X1, X2, X3 are provided between the capacitor C3 and the battery 23. Specifically, the positive terminal of the battery 23 and one end of the capacitor C3 are connected through the relay X1, and the negative terminal of the battery 23 and the other end of the capacitor C3 are connected through the relay X2. Further, a circuit in which the relay X3 and a resistor R4 are connected in series is connected in parallel to the relay X1. Moreover, the on and off of each of the relays X1 to X3 are controlled by the vehicle controller 24, shown in FIG. 1.

Upon receipt of an electromagnetic signal outputted from the power transmission coil 11, the subcoil SC1 outputs this electromagnetic signal to the vehicle controller 24. Specifically, as the vehicle 20 enters the parking space 32, the subcoil SC1 approaches the power transmission coil 11 with the movement of the vehicle 20, and the subcoil SC1 then receives an electromagnetic signal outputted from the power transmission coil 11 and outputs this received electromagnetic signal to the vehicle controller 24.

Figures 4, 5:
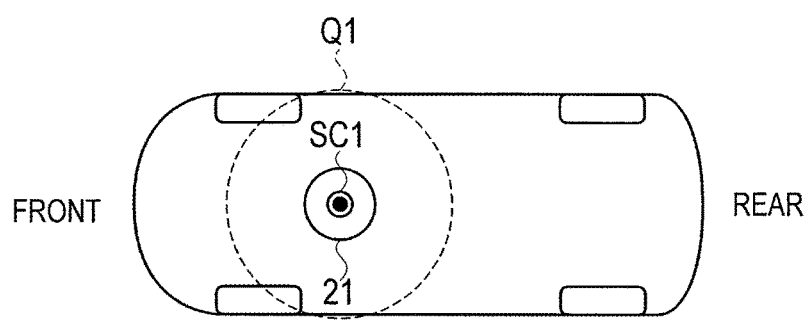
FIG. 4 is an explanatory diagram showing the arrangement of the power reception coil and the subcoils of the wireless power supply system according to the first embodiment of the present invention.
FIG. 5 is an explanatory diagram showing a data string of a pairing signal used in the wireless power supply system according to the first embodiment of the present invention.

FIG. 4 is an explanatory diagram showing the arrangement of the power reception coil 21 and the subcoil SC1, mounted at the bottom of the vehicle 20, and a signal receivable range Q1 of the subcoil SC1. As shown in FIG. 4, the subcoil SC1 is provided near of the power reception coil 21. Specifically, as shown in FIG. 6, the subcoil SC1 is wound around the same core as the power reception coil 21

Also, the subcoil SC1 can receive an electromagnetic signal present in the signal receivable range Q1. That is, if the signal receivable range Q1 is positioned to overlap the excitation range of the power transmission coil 11, the subcoil SC1 can receive an electromagnetic signal outputted from the power transmission coil 11.

Moreover, in this embodiment, the power transmission coil 11 is set to the first excitation when the vehicle 20 approaches the parking space 32. In the first excitation, as will be described later, an electromagnetic signal containing a pairing signal is outputted. Also, the vehicle controller 24 turns on the relays X2, X3 and turns off the relay X1 to pre-charge (charge) the capacitor C3. That is, the battery 23 and the capacitor C3 are connected through the resistor R4 to pre-charge the capacitor C3. Then, the electromagnetic signal, transmitted from the power transmission coil 11, is received by the subcoil SC1, and pairing is performed between the vehicle 20 and the ground unit 51 by using the pairing signal contained in this electromagnetic signal.

Now, the reason for pre-charging the capacitor C3 will be described. As shown in FIG. 4, the subcoil SC1 is provided near the power reception coil 21. Specifically, as shown in FIG. 6, the power reception coil 21 is helically wound around the ferrite core 61, and the subcoil SC1 is also wound around the ferrite core 61 at its center portion. Here, as shown in FIG. 3, the power reception coil 21 is connected to the capacitor C3, which is used for smoothing. Hence, when the capacitor C3 is not charged, the voltage received by the subcoil SC1 is supplied to the capacitor C3, which retards the rise of the voltage generated across the subcoil SC1. This can occur not only when the subcoil SC1 is wound around the same core as the power reception coil 21 but also when the subcoil SC1 is disposed near the power reception coil.

Figure 7:
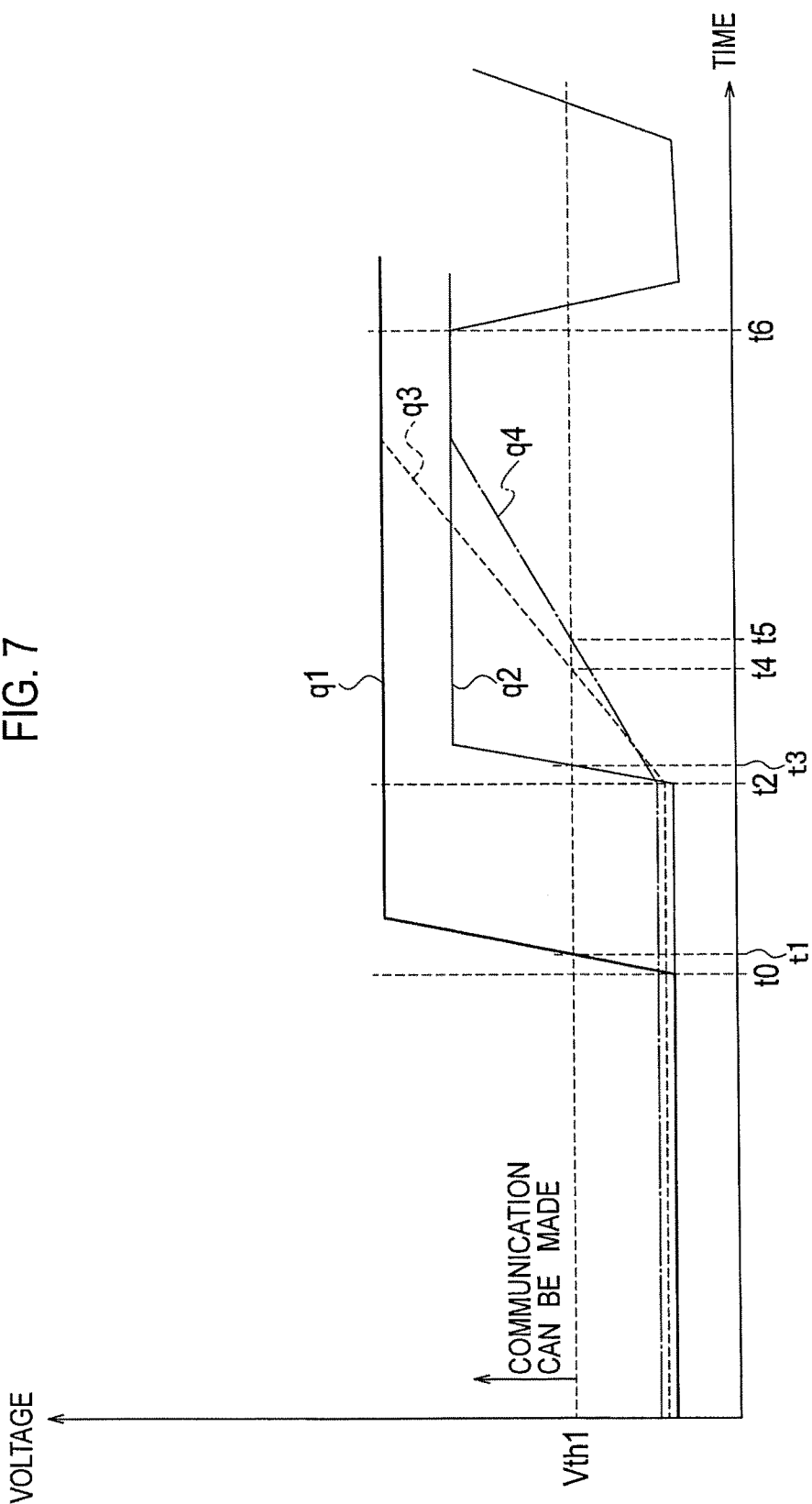
FIG. 7 is a characteristic chart showing voltage generated across the power reception coil and voltage generated across the subcoil.

This will be described with reference to a characteristic chart shown in FIG. 7. FIG. 7 shows changes in the voltages generated across the power reception coil 21 and the subcoil SC1. A curve q1 represents the change in the voltage generated across the power reception coil 21 in a case where the capacitor C3 is pre-charged at a time t0. Also, a curve q3 represents the change in the voltage generated across the power reception coil 21 in a case where the capacitor C3 is not pre-charged. A curve q2 represents the change in the voltage generated across the subcoil SC1 in the case where the capacitor C3 is pre-charged at the time t0. A curve q4 represents the change in the voltage generated across the subcoil SC1 in the case where the capacitor C3 is not pre-charged.

As shown by the curve q4, in the case where the capacitor C3 is not pre-charged, the voltage generated across the subcoil SC1 gradually rises and reaches a certain level after the signal receivable range Q1 of the subcoil SC1 and the excitation range of the power transmission coil 11 overlap each other at a time t2. Here, the voltage generated across the subcoil SC1 reaches a first threshold voltage Vth1 at a time t5, and therefore a pairing process starts from this time t5. That is, in the case where the capacitor C3 is not pre-charged, the voltage generated across the subcoil SC1 is consumed to charge the capacitor C3, and therefore it takes a long time for the voltage level of the pairing signal received by the subcoil SC1 to reach the first threshold voltage Vth1.

In contrast, as shown by the curve q2, in the case where the capacitor C3 is pre-charged, the voltage generated across the subcoil SC1 abruptly rises and reaches the certain level after the signal receivable range Q1 of the subcoil SC1 and the excitation range of the power transmission coil 11 overlap each other at the time t2. That is, with the capacitor C3 pre-charged, the voltage generated across the subcoil SC1 is not supplied to the capacitor C3, and therefore the voltage generated across the subcoil SC1 instantly reaches the first threshold voltage Vth1. Specifically, the voltage generated across the subcoil SC1 reaches the first threshold voltage Vth1 at a time t3 shown in FIG. 7. In this way, the pairing process can be performed instantly.

Meanwhile, the same applies to the power reception coil 21 as well. As shown by the curve q3, in the case where the capacitor C3 is not pre-charged, the voltage generated across the power reception coil 21 gradually rises and reaches a certain level after a signal receivable range Q0 (see FIG. 18 to be mentioned later) of the power reception coil 21 and the excitation range of the power transmission coil 11 overlap each other at the time t2. Here, the voltage generated across the power reception coil 21 reaches the first threshold voltage Vth1 at a time t4, and therefore the pairing process starts from this time t4.

In contrast, in the case where the capacitor C3 is pre-charged at the time t0, the voltage generated across the power reception coil 21 rises at this time t0 and reaches a predetermined voltage level at a time t1. Hence, when the signal receivable range Q0 of the power reception coil 21 and the excitation range of the power transmission coil 11 overlap each other at the time t2, the voltage generated across the power reception coil 21 is already above the first threshold voltage Vth1 and the pairing process can therefore be started.

With the capacitor C3 pre-charged before the signal receivable ranges Q1, Q0 of the subcoil SC1 and the power reception coil 21 approach the power transmission coil 11 as described above, the voltage received by the subcoil SC1 or the power reception coil 21 instantly reaches the first threshold voltage Vth1. Hence, the pairing process can be quickly performed.

When the pairing between the power transmission coil 11 of the ground unit 51 and the power reception coil 21 of the vehicle 20 is completed by the process described above, the power transmission coil 11 is set to the second excitation. In this excitation, whether or not the vehicle 20 is parked at the predetermined position in the parking space 32 is determined from the level of the electromagnetic signal received by the subcoil SC1. Thereafter, if it is determined that the vehicle 20 is parked at the predetermined position in the parking space 32, the power transmission coil 11 is set to the third excitation to supply power for charging to the battery 23.

Here, the power supplied to the power transmission coil 11 in the second excitation is higher than the power supplied to the power transmission coil 11 in the first excitation. This is to prevent the vehicle controller 24 from falsely recognizing that the power transmission coil 11 is set to the second excitation while the power transmission coil 11 is set to the first excitation.

The first excitation will be described below with reference to a data string shown in FIG. 5. In the first excitation, the power transmission coil 11 is excited in a pattern containing a pairing signal formed of a data string of a start bit, an ID, a data-length code, identification data, a sum value, and a stop bit. Thus, the electromagnetic signal to be outputted from the power transmission coil 11 contains the pairing signal shown in FIG. 5.

In the identification data contained in the pairing signal, a unique bit string is set which has been assigned to the corresponding ground unit. For example, "1, 0, 1, 0" is set for a given ground unit in the case of four-bit data. The ground controller 13 excites the power transmission coil 11 such that the pairing signal shown in FIG. 5 can be contained. In sum, in the first excitation, the power transmission coil 11 is excited with an excitation pattern containing the pairing signal.

After the power transmission coil 11 is excited, the subcoil SC1 receives the pairing signal when the signal receivable range Q1 of the subcoil SC1 reaches such a position as overlap the excitation range of the power transmission coil 11. This pairing signal is supplied to the vehicle controller 24, shown in FIG. 1.

The vehicle controller 24 reads the identification data out of the pairing signal received by the subcoil SC1. The vehicle controller 24 then transmits the read identification data to the communication unit 14 through the communication unit 25. The ground controller 13 determines whether or not the identification data transmitted from the power transmission coil 11 and the identification data received by the communication unit 14 match each other. If they match each other, the power reception device 102 and the power transmission device 101 are paired with each other.

Figure 8:
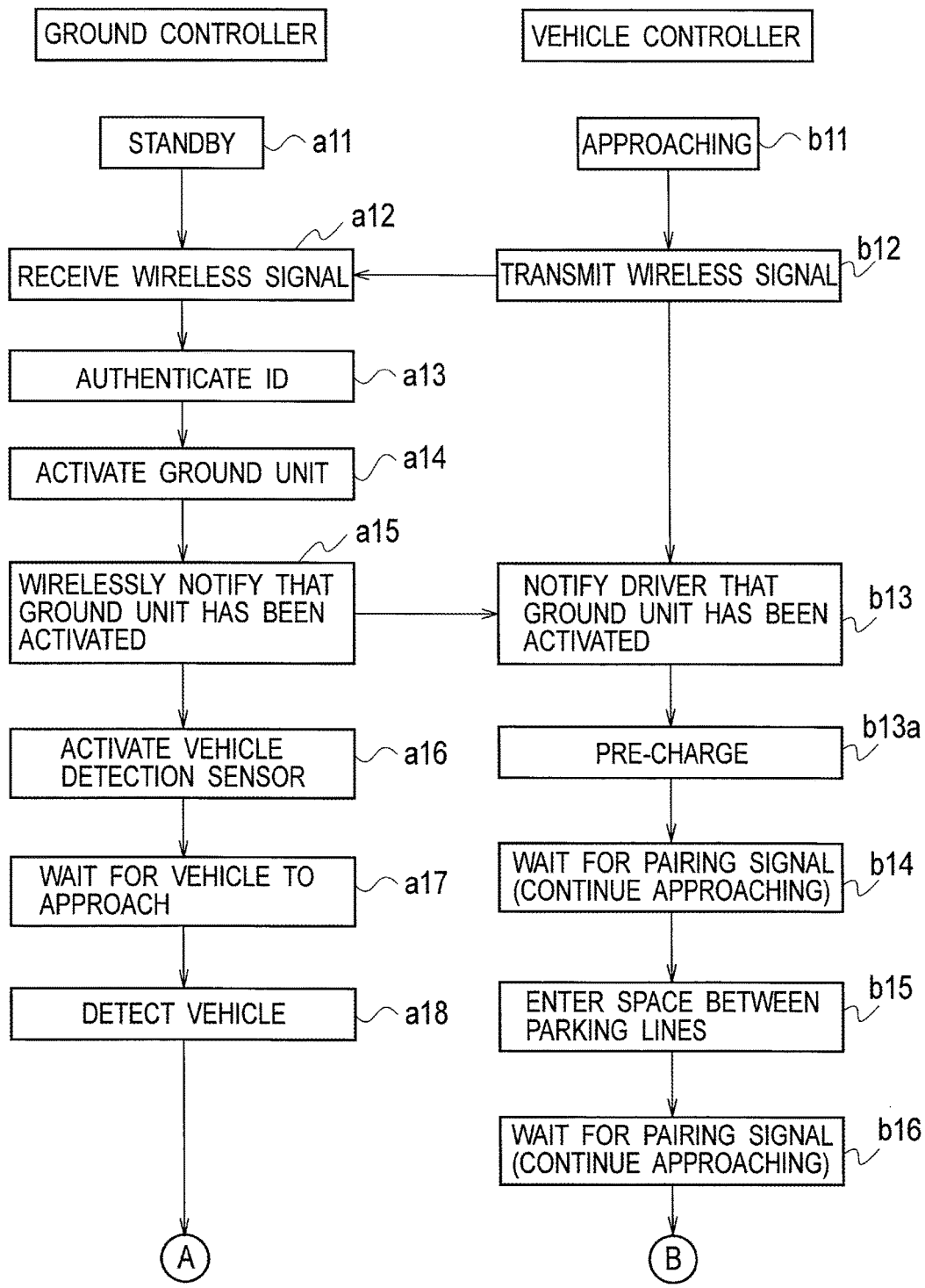
FIG. 8 is the first part of a flowchart showing the procedure of processing by the wireless power supply system according to the first embodiment of the present invention.

Next, description will be given of operation from when the vehicle 20 approaches the parking space 32 to when the vehicle 20 stops at the predetermined position in the parking space 32, with reference to a flowchart shown in FIG. 8 and FIG. 9 and explanatory diagrams shown in FIG. 10 to FIG. 13.

Figure 10:
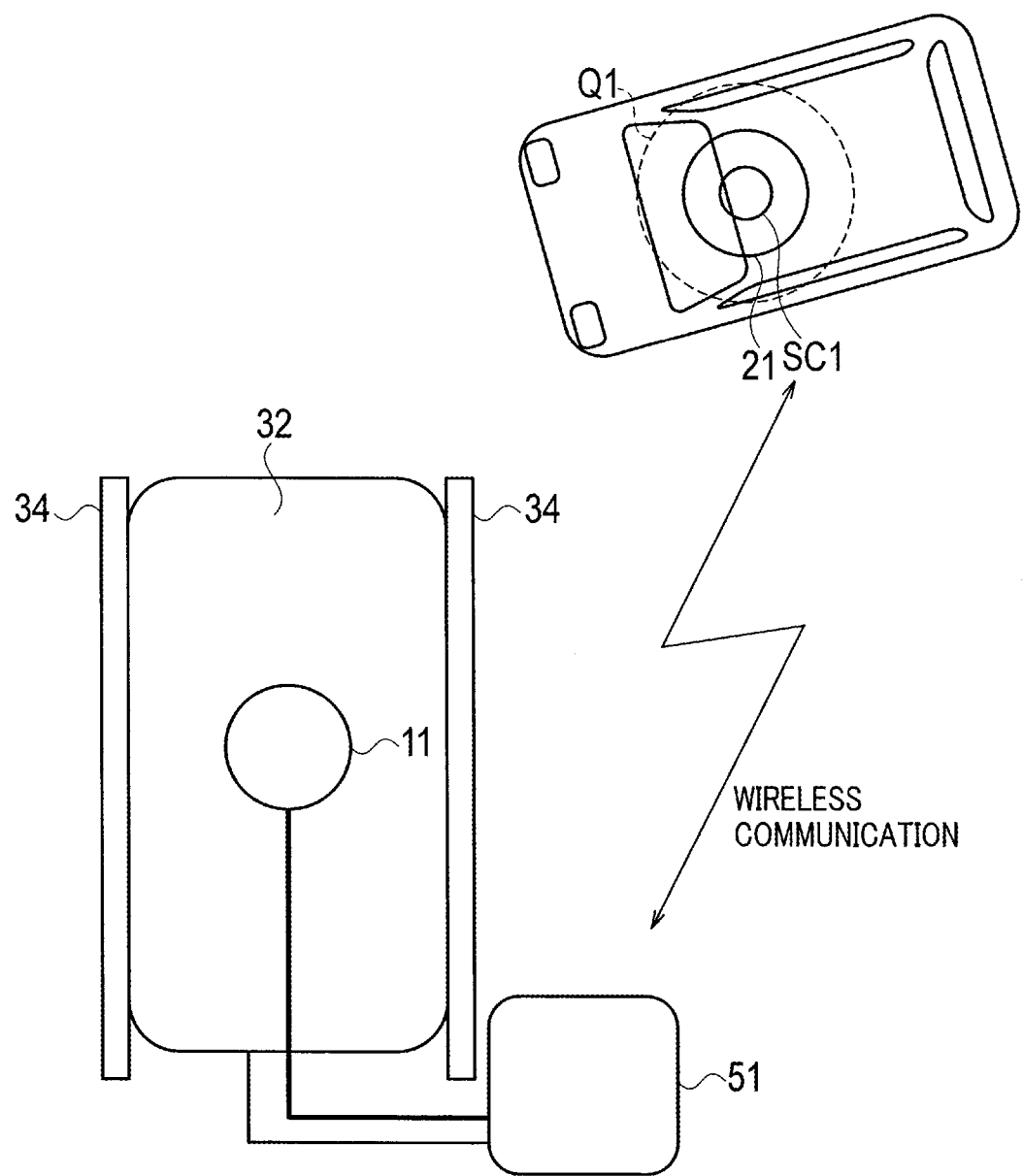
FIG. 10 is an explanatory diagram according to the first embodiment of the present invention showing a state where the vehicle is approaching one of the parking spaces.

FIG. 10 shows a state where the vehicle 20 is approaching in the parking space 32 surrounding by the parking lines 34. In this state, the ground controller 13 is on standby (Step a11 in FIG. 8) and the vehicle controller 24 is approaching the parking space 32 (Step b11). Then, the vehicle controller 24 transmits a wireless signal containing a vehicle ID from the communication unit 25 through communication using a LAN (Local Area Network) or the like (Step b12).

Upon receipt of this wireless signal, the communication unit 14 of the ground unit 51 recognizes that the vehicle ID contained in the wireless signal is a valid vehicle ID (Step a13). Then, the ground unit 51 is activated (Step a14), and the vehicle controller 24 is notified with a wireless signal that the ground unit 51 has been activated (Step a15).

The vehicle controller 24 notifies the driver of the vehicle 20 that the ground unit 51 has been activated, for example, by displaying such information on a display (not shown) (Step b13). In this way, the driver can recognize that the ground unit 51 has been activated. Further, the vehicle controller 24 turns on the relays X2, X3, shown in FIG. 3, and turns off the relay X1, shown in FIG. 3, to connect the battery 23 and the capacitor C3 to each other. Consequently, power is supplied from the battery 23 to the capacitor C3, thereby pre-charging the capacitor C3 (Step b13a). The vehicle controller 24 waits for a pairing signal (Step b14).

After the ground unit 51 is activated, the ground controller 13 activates the vehicle detection sensor 33 (Step a16). The ground controller 13 waits for the vehicle 20 to approach (Step a17).

Figure 11:
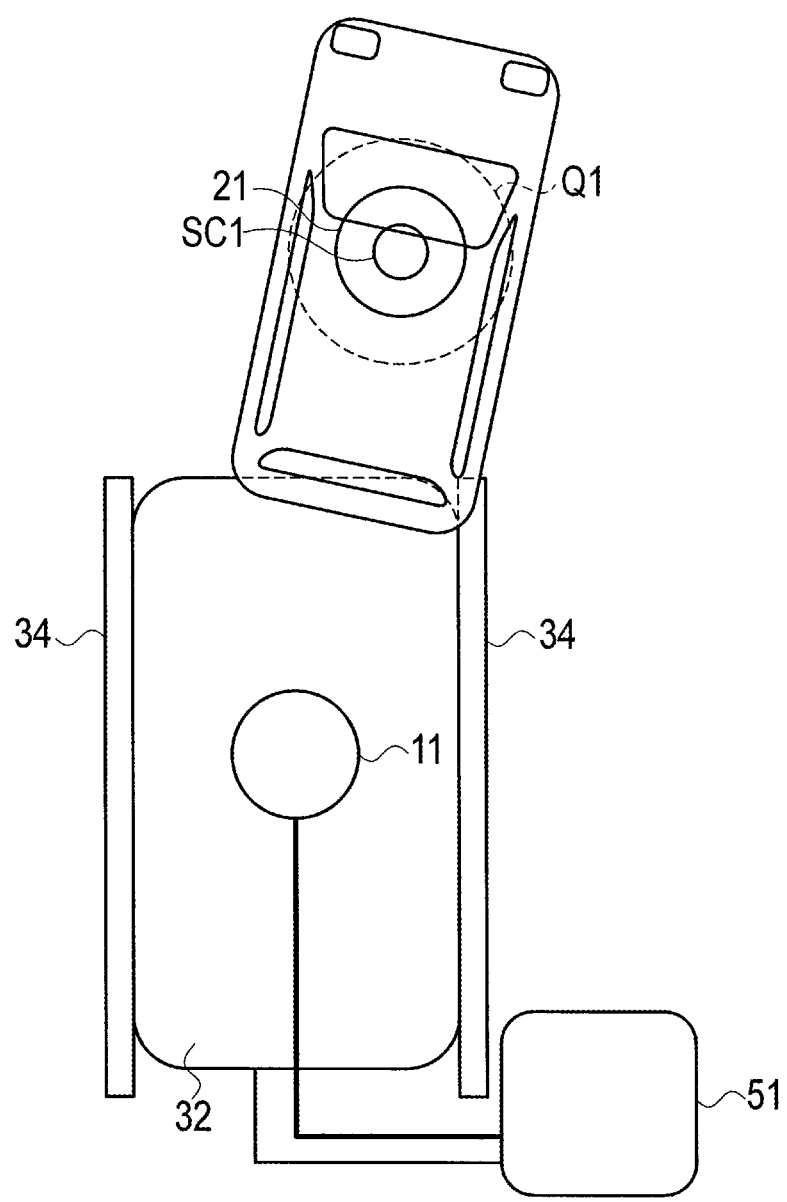
FIG. 11 is an explanatory diagram according to the first embodiment of the present invention showing a state where the vehicle is entering the parking space.
Figure 12:
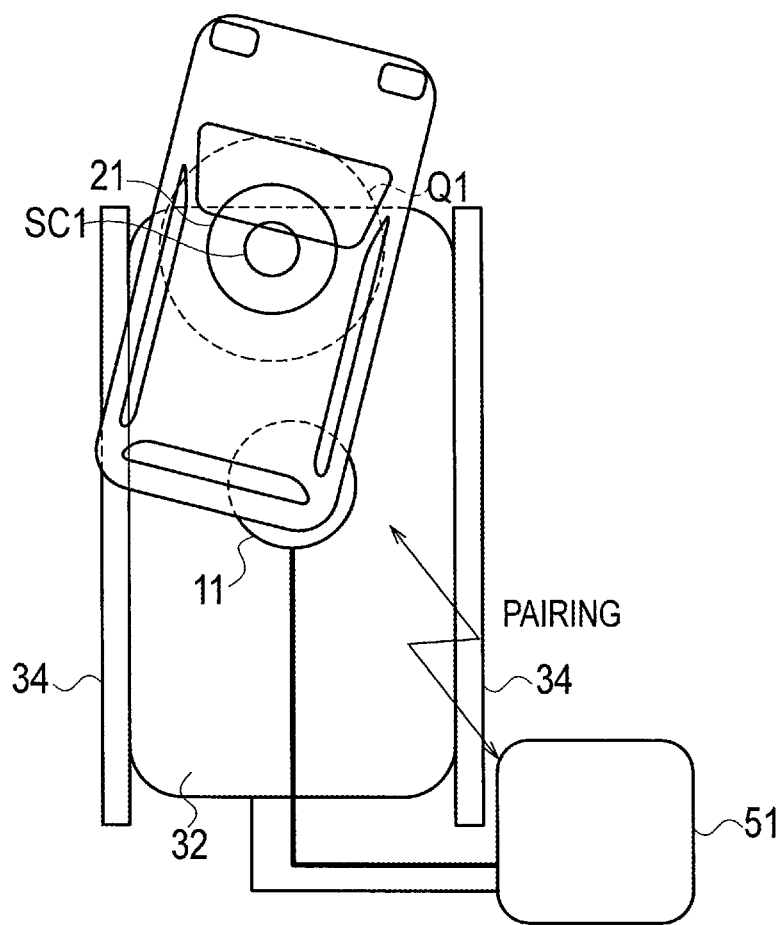
FIG. 12 is an explanatory diagram according to the first embodiment of the present invention showing a state where the vehicle has entered the parking space.

Then, when part of the vehicle 20 enters the parking space 32 as shown in FIG. 11 (Step b15), the vehicle detection sensor 33 detects the entrance of the vehicle 20 into the parking space 32 (Step a18). The ground controller 13 excites the power transmission coil 11 in an excitation pattern containing a pairing signal. Specifically, the ground controller 13 sets the power transmission coil 11 to the above-mentioned first excitation to transmit a pairing signal (Step a19 in FIG. 9). Further, the ground controller 13 continues the first excitation (Step a20). At this point, the vehicle controller 24 is waiting for a pairing signal (Step b16).

Figure 9:
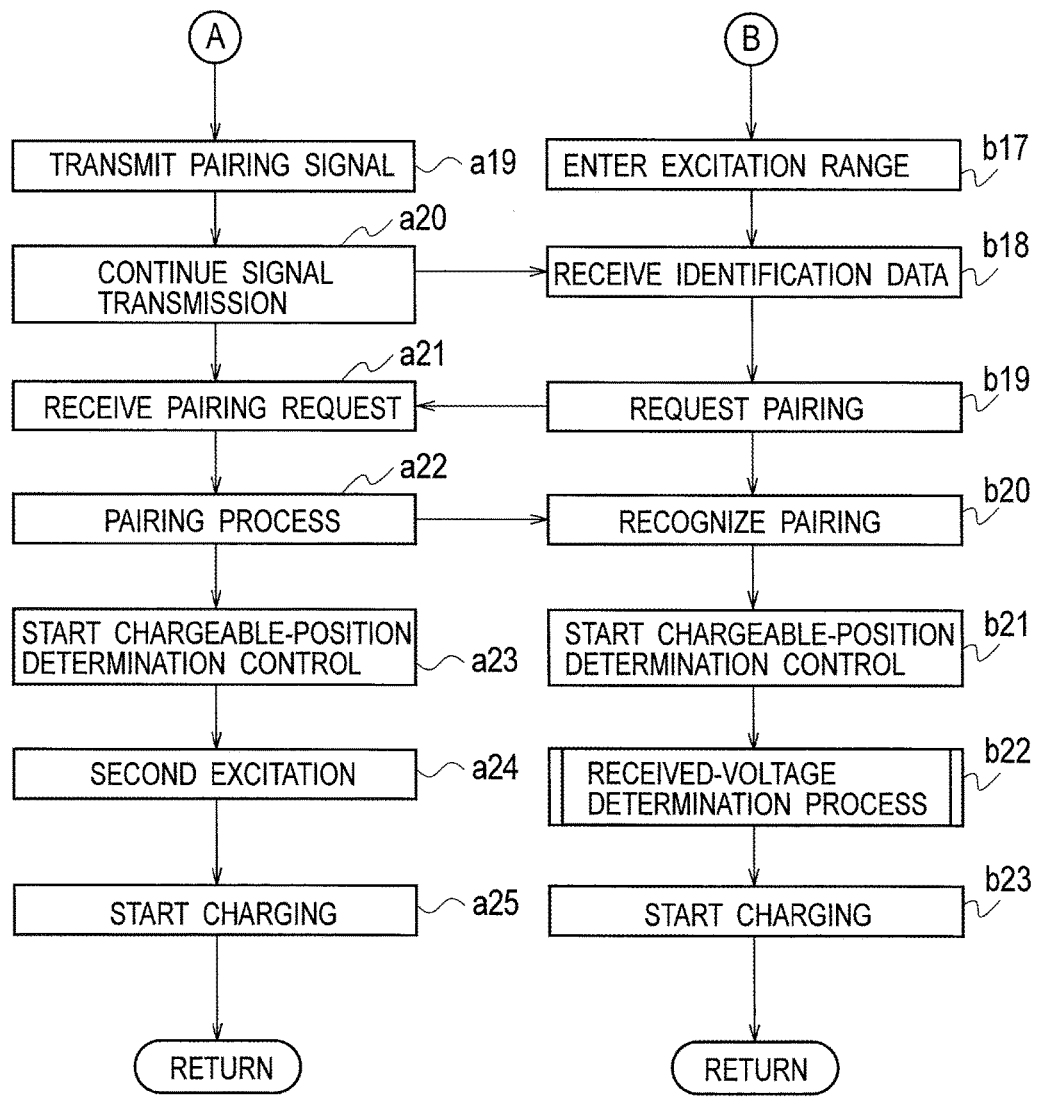
FIG. 9 is a second part of a flowchart showing the procedure of processing by the wireless power supply system according to the first embodiment of the present invention.

Then, the signal receivable range Q1 of the subcoil SC1 enters the excitation range of the power transmission coil 11 as the vehicle 20 approaches the power transmission reaches such a position as to overlap the excitation range of the power transmission coil 11 (Step b17 in FIG. 9). Thus, the subcoil SC1 receives a pairing signal, and the vehicle controller 24 recognizes the identification data contained in this pairing signal (Step b18)

The vehicle controller 24 transmits the recognized identification data through the communication unit 25 to request the ground controller 13 to perform pairing (Step b19). The ground controller 13 receives the requested pairing (Step a21), and receives the identification data. Then, the ground controller 13 determines whether or not the identification data contained in the pairing signal transmitted by the first excitation and the identification data transmitted from the vehicle controller 24 match each other. If they match each other, the power reception device 102 and the power transmission device 101 are paired with each other (Step a22). Then, the ground controller 13 starts chargeable-position determination control (Step a23). The vehicle controller 24 recognizes that the pairing has been done (Step b20), and starts chargeable-position determination control (Step b21).

The ground controller 13 controls the current flowing into the power transmission coil 11 such that the power transmission coil 11 can be set to the second excitation (Step a24). Then, the ground controller 13 shifts to charging of the battery 23 (Step a25). The vehicle controller 24 determines the level of the voltage received by the subcoil SC1, provided in the same core as the power reception coil 21 (Step b22). Details of this received-voltage determination process will be described later.

Figure 13:
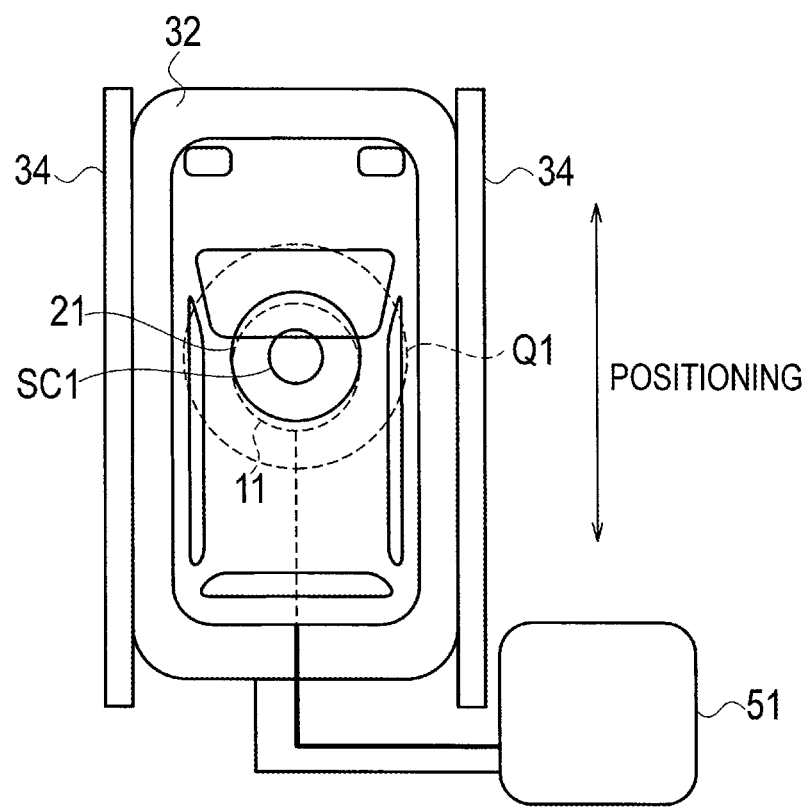
FIG. 13 is an explanatory diagram according to the first embodiment of the present invention showing a state where the vehicle is stopped at a predetermined position in the parking space.

Then, if the vehicle 20 is stopped at the predetermined position in the parking space 32, specifically, if the vehicle 20 reaches such a position that the power transmission coil 11 and the power reception coil 21 overlap each other, as shown in FIG. 13, the ground controller 13 sets the power transmission coil 11 to the third excitation to shift to charging of the battery 23 (Step b23). In this step, the relays X1, X2, shown in FIG. 3, are turned on and the relay X3, shown in FIG. 3, is turned off.

Next, a detailed procedure of the received-voltage determination process, shown in Step b22 in FIG. 9, will be described with reference to a flowchart shown in FIG. 14. When the received-voltage determination process starts, the ground controller 13 sets the power transmission coil 11 to the second excitation. Specifically, the ground controller 13 excites the power transmission coil 11 with a voltage higher than that in the above-mentioned first excitation and transmits power from this power transmission coil 11.

Figure 14:
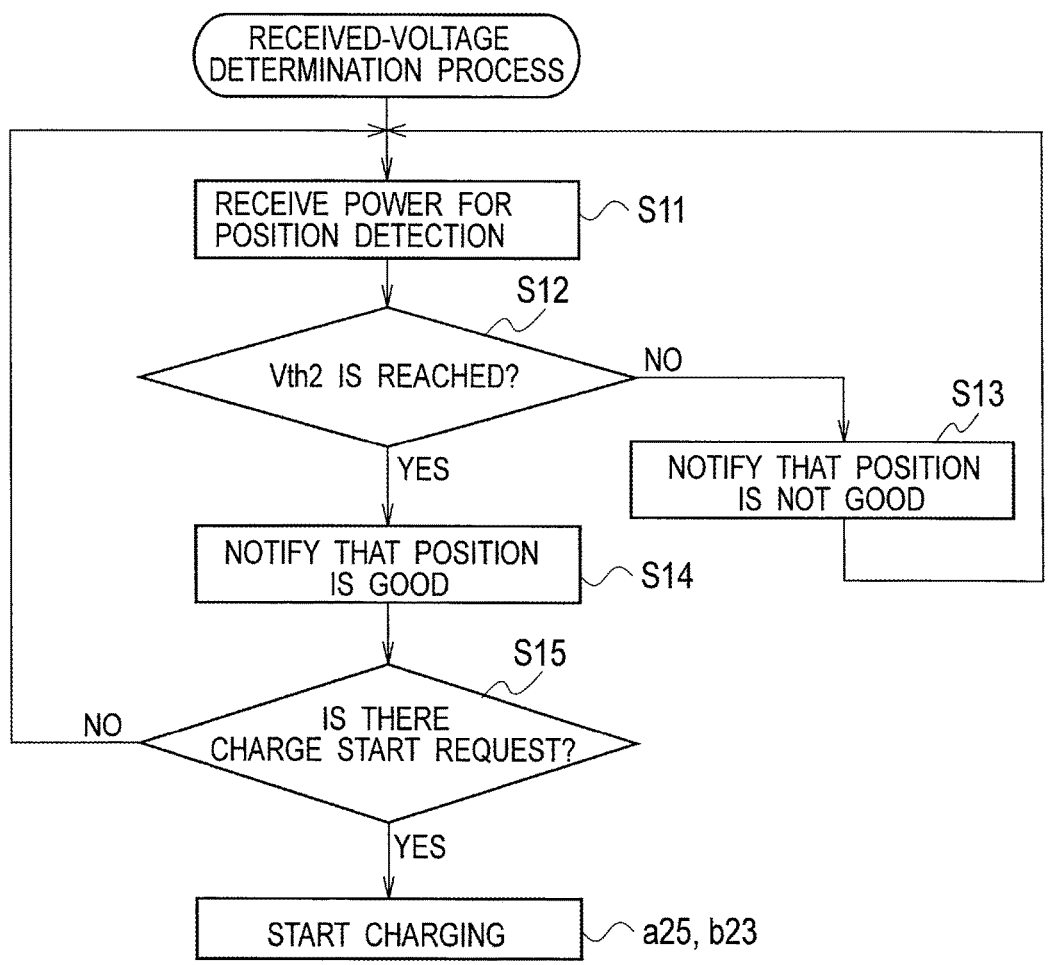
FIG. 14 is a flowchart showing the procedure of a received-voltage determination process by the wireless power supply system according to the first embodiment of the present invention.

In Step S11 in FIG. 14, the subcoil SC1, when provided by the power reception coil 21 receives the power generated by the second excitation, the vehicle controller 24 determines whether or not the voltage of this power has reached a preset second threshold voltage Vth2 (>Vth1).

If the voltage has not yet reached the second threshold voltage Vth2 (NO in Step S12), the vehicle controller 24 determines that the stop position of the vehicle 20 has not yet reached the predetermined position, notifies the driver accordingly in Step S13, and brings the process back to Step S11.

On the other hand, if the voltage received by the subcoil SC1 has reached the second threshold voltage Vth2 (YES in Step S12), the vehicle controller 24 determines that the vehicle 20 has been reached at the predetermined position. Then, in Step S14, the vehicle controller 24 notifies the driver that the stop position of the vehicle has reached a chargeable position, by displaying such information on the display (not shown) or the like. Seeing this display, the driver stops the vehicle 20.

In other words, the larger the area of the overlap between the power transmission coil 11 and the subcoil SC1, the larger the voltage received by the subcoil SC1. Thus, by monitoring the voltage received by the subcoil SC1, it is possible to determine whether or not the vehicle 20 is stopped at the predetermined position (chargeable position) in the parking space 32.

In Step S15, the vehicle controller 24 determines whether or not the driver has inputted a charge start request. If the driver has inputted a charge start request (YES in Step S15), charging of the battery 23 is started in Steps a25, b23 (see FIG. 9).

The above processing will be described with reference to Parts (a), (b) of FIG. 15. Part (a) of FIG. 15 is a waveform chart showing the change in the voltage for the excitation of the power transmission coil 11, while Part (b) of FIG. 15 is a waveform chart showing the change in the voltage received by the subcoil SC1. At a time t0 shown in Part (a) of FIG. 15, the power transmission coil 11 is set to the first excitation. Specifically, the power transmission coil 11 is excited with an excitation pattern containing a pairing signal. As shown in Part (b) of FIG. 15, the subcoil SC1 receives the pairing signal at the time t0 and the intensity of the received signal rises further, so that pairing is performed at a time t1. Then, at a time t2, the power transmission coil 11 is switched from the first excitation to the second excitation. Since the vehicle 20 is moving relative to the parking space 32, the voltage received by the power reception coil 21 varies as shown in Part (b) of FIG. 15. When the received voltage then reaches the preset second threshold voltage Vth2, the vehicle 20 is determined to have reached the chargeable position, and the procedure shifts to charging processing of the battery 23.

As described above, in the wireless power supply system according to the first embodiment, the capacitor C3 is pre-charged after the vehicle 20 approaches the parking space 32. In this way, if the power transmission coil 11 is set to the first excitation and transmits a pairing signal, the vehicle controller 24 can acquire the identification data contained in the pairing signal without being affected by the capacitor C3. Consequently, the power transmission device 101 and the power reception device 102 can be paired with each other quickly.

Also, when the subcoil SC1 receives a pairing signal, the voltage of the signal received by the subcoil SC1 rises instantly without being affected by the capacitor C3, since the capacitor C3 is pre-charged. Thus, when the power transmission coil 11 is set to the first excitation and transmits a pairing signal, the voltage generated across the subcoil SC1 rises instantly, and the pairing signal can therefore be acquired instantly. Consequently, the power transmission device 101 and the power reception device 102 can be paired with each other quickly.

[Description of Second Embodiment]

Next, a second embodiment will be described. In the above-described first embodiment, the description has been given of the example where the power reception device 102 and the power transmission device 101 are paired with each other based on a pairing signal received by the subcoil SC1. In the second embodiment, the subcoil SC1 is not mounted, and the power reception coil 21 receives a pairing signal and the power reception device 102 and the power transmission device 101 are paired with each other based on this pairing signal.

Figure 16:
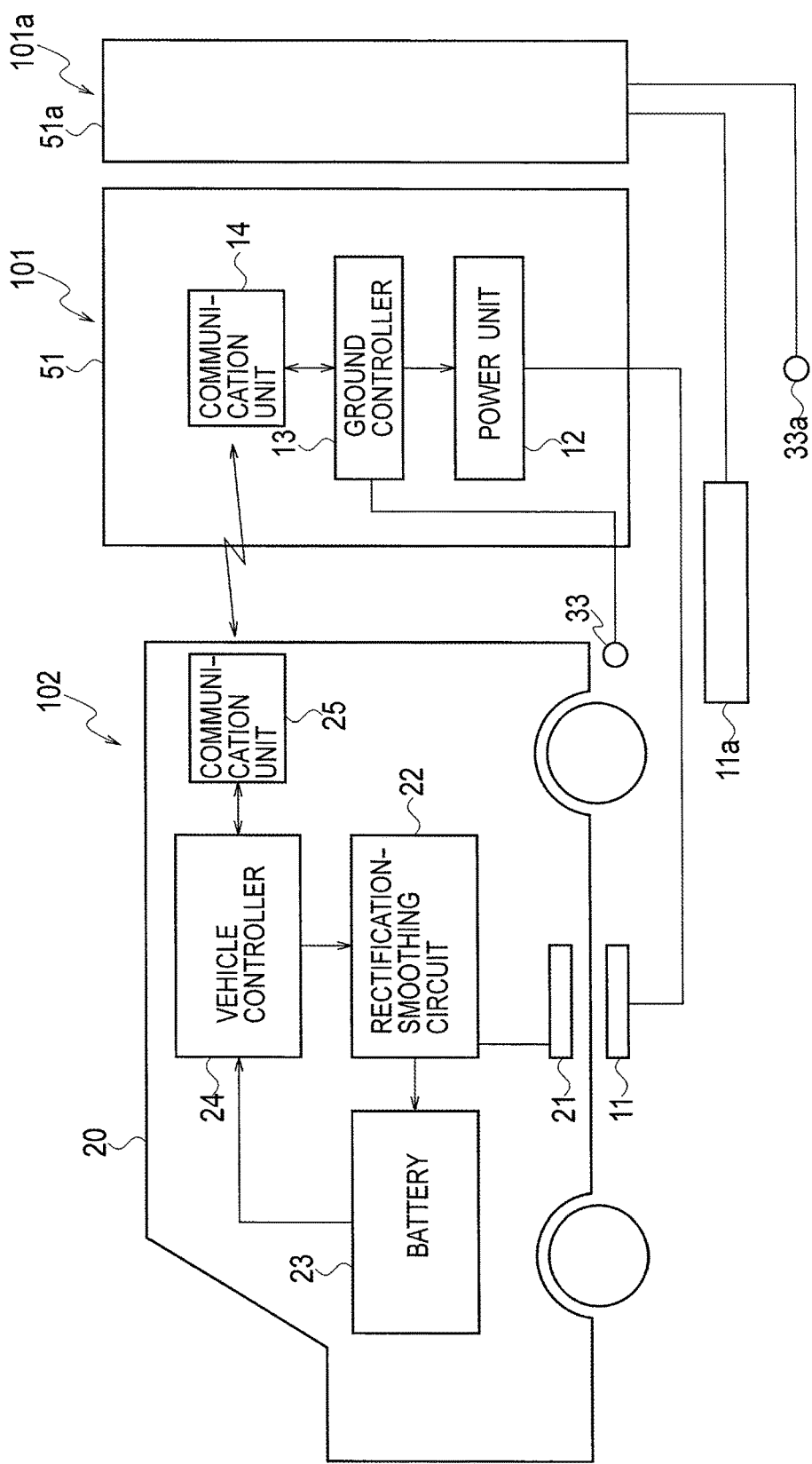
FIG. 16 is a block diagram showing the configuration of a wireless power supply system according to a second embodiment of the present invention.
Figure 17:
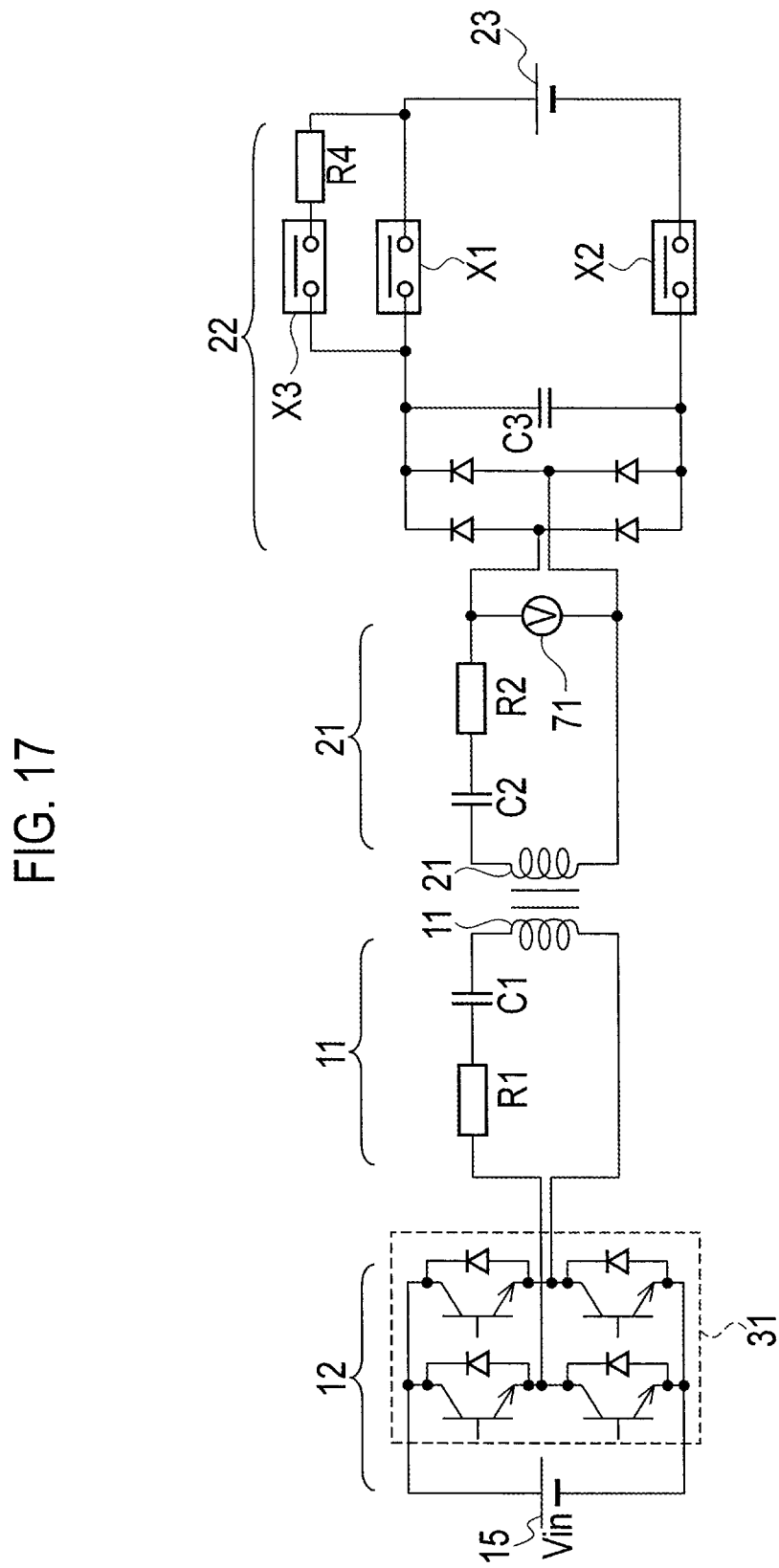
FIG. 17 is a circuit diagram of a power unit, a power transmission coil, a power reception coil, and a rectification-smoothing circuit of the wireless power supply system according to the second embodiment of the present invention.
Figure 18:
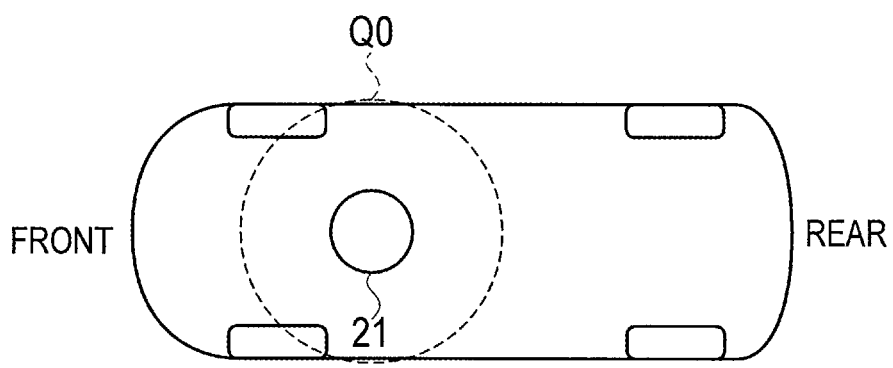
FIG. 18 is an explanatory diagram showing the arrangement of the power reception coil of the wireless power supply system according to the second embodiment of the present invention.

FIG. 16 is a block diagram showing the configuration of a wireless power supply system according to the second embodiment. FIG. 17 is a circuit diagram showing detailed configurations of the power unit 12, the power transmission coil 11, the power reception coil 21, and the rectification-smoothing circuit 22 shown in FIG. 16 and peripheral elements thereof Also, FIG. 18 is an explanatory diagram showing the power reception coil 21, provided at the bottom of the vehicle 20, and the signal receivable range Q0 therearound.

The wireless power supply system according to the second embodiment differs from that in the first embodiment, shown in FIG. 1 and FIG. 3, in that the subcoil SC1 is not mounted and in that a voltmeter 71 (see FIG. 17) is provided. The other parts of the configuration are similar to the first embodiment, and they will hence be denoted by the same reference signs and description of their configurations will be omitted.

The voltmeter 71 is configured to measure the voltage generated across the power reception coil 21 and transmit the measured voltage data to the vehicle controller 24 shown in FIG. 16.

Moreover, in the wireless power supply system according to the second embodiment, the relays X2, X3 shown in FIG. 17 are turned on and the relay X1 shown in FIG. 17 are turned off to pre-charge the capacitor C3 before the signal receivable range Q0 (see FIG. 18) of the power reception coil 21 overlaps the excitation range of the power transmission coil 11. Then, when the signal receivable range Q0 overlaps the excitation range of the power transmission coil 11, the power reception coil 21 receives a pairing signal transmitted from the power transmission coil 11, and the voltmeter 71 measures the voltage generated across the power reception coil 21. This pairing signal is supplied to the vehicle controller 24.

Then, the power reception device 102 and the power transmission device 101 are paired with each other if the identification data contained in the pairing signal received by the power reception coil 21 and the identification data contained in the pairing signal outputted from the ground controller 13 match each other.

Also, as in the above-described first embodiment, the capacitor C3 is pre-charged before the signal receivable range Q0 overlaps the excitation range of the power transmission coil 11. Thus, as shown by the curve q1 in FIG. 7, the voltage generated across the power reception coil 21 reaches the first threshold voltage Vth1 at the time t1. Hence, the pairing process can be executed instantly.

As described above, in the wireless power supply system according to the second embodiment, the capacitor C3 is pre-charged after the vehicle 20 approaches the parking space 32. In this way, when the power reception coil 21 receives a pairing signal, the voltage of the signal received by the power reception coil 21 rises instantly without being affected by the capacitor C3. Thus, when the power transmission coil 11 is set to the first excitation and transmits a pairing signal, the voltage generated across the power reception coil 21 rises instantly, and the pairing signal can therefore be acquired instantly. Consequently, the power reception device 102 and the power transmission device 101 can be paired with each other quickly.

[Description of Third Embodiment]

Next, a third embodiment will be described. In the above-described first embodiment, the description has been given of the example where the subcoil SC1, provided by the power reception coil 21, is used to receive a pairing signal transmitted from the power transmission coil 11 and pair the power reception device 102 and the power transmission device 101 with each other. In contrast, in the third embodiment, a plurality of subcoils are mounted, and each subcoil is used to receive a pairing signal so as to perform quick pairing. Also, after the pairing is completed, the capacitor C3 is pre-charged so as to quickly perform positioning by means of the second excitation. Details will be described below.

Figure 19:
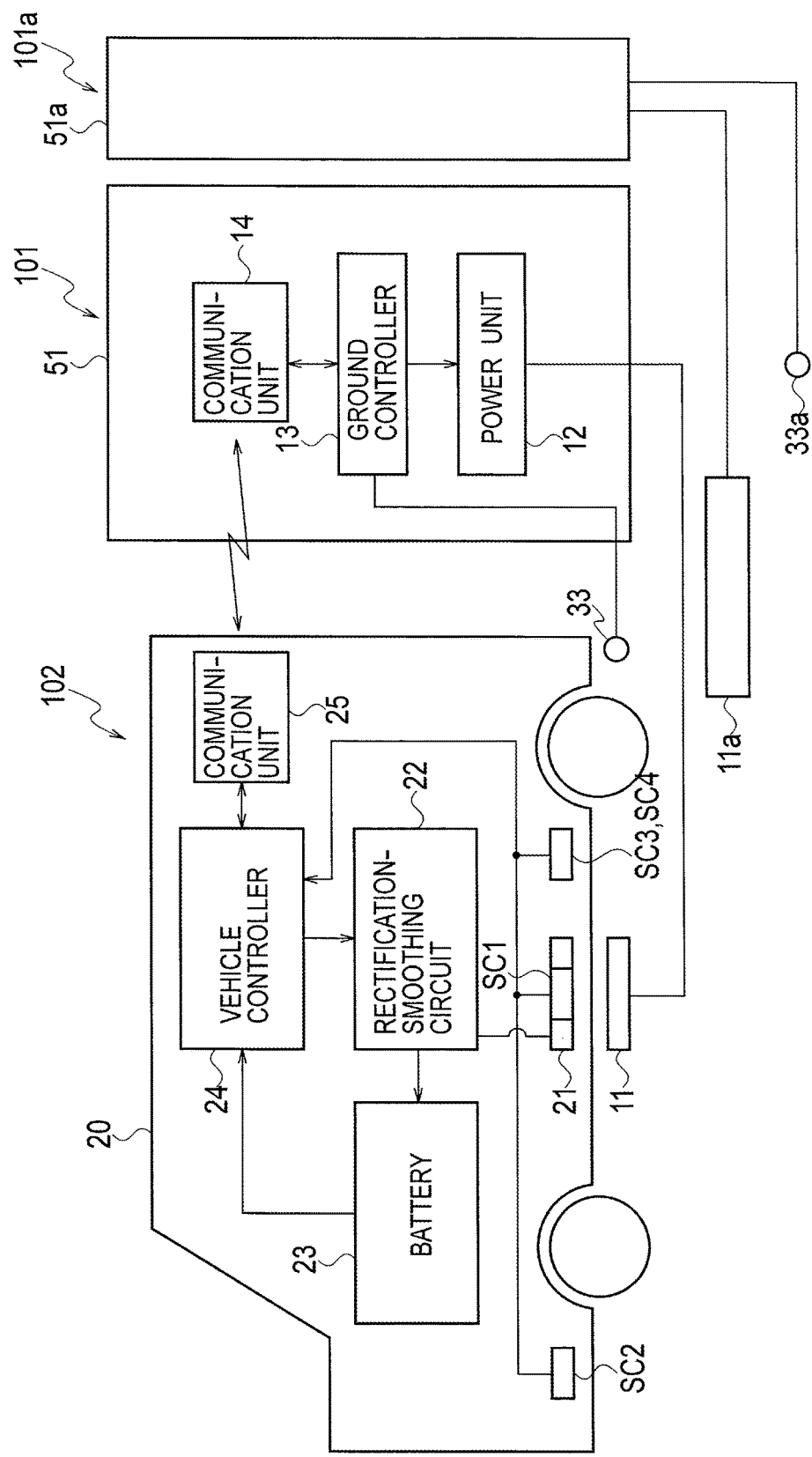
FIG. 19 is a block diagram showing the configuration of a wireless power supply system according to a third embodiment of the present invention.

FIG. 19 is a block diagram showing the configuration of a wireless power supply system according to the third embodiment. As shown in FIG. 19, the wireless power supply system according to the third embodiment differs from that in the above-described first embodiment in that the power reception device 102 includes subcoils SC2 to SC4 in addition to the subcoil SC1. Note that the same parts in FIG. 19 as those in FIG. 1 will be denoted by the same reference signs, and description of their configurations will be omitted.

Figure 20:
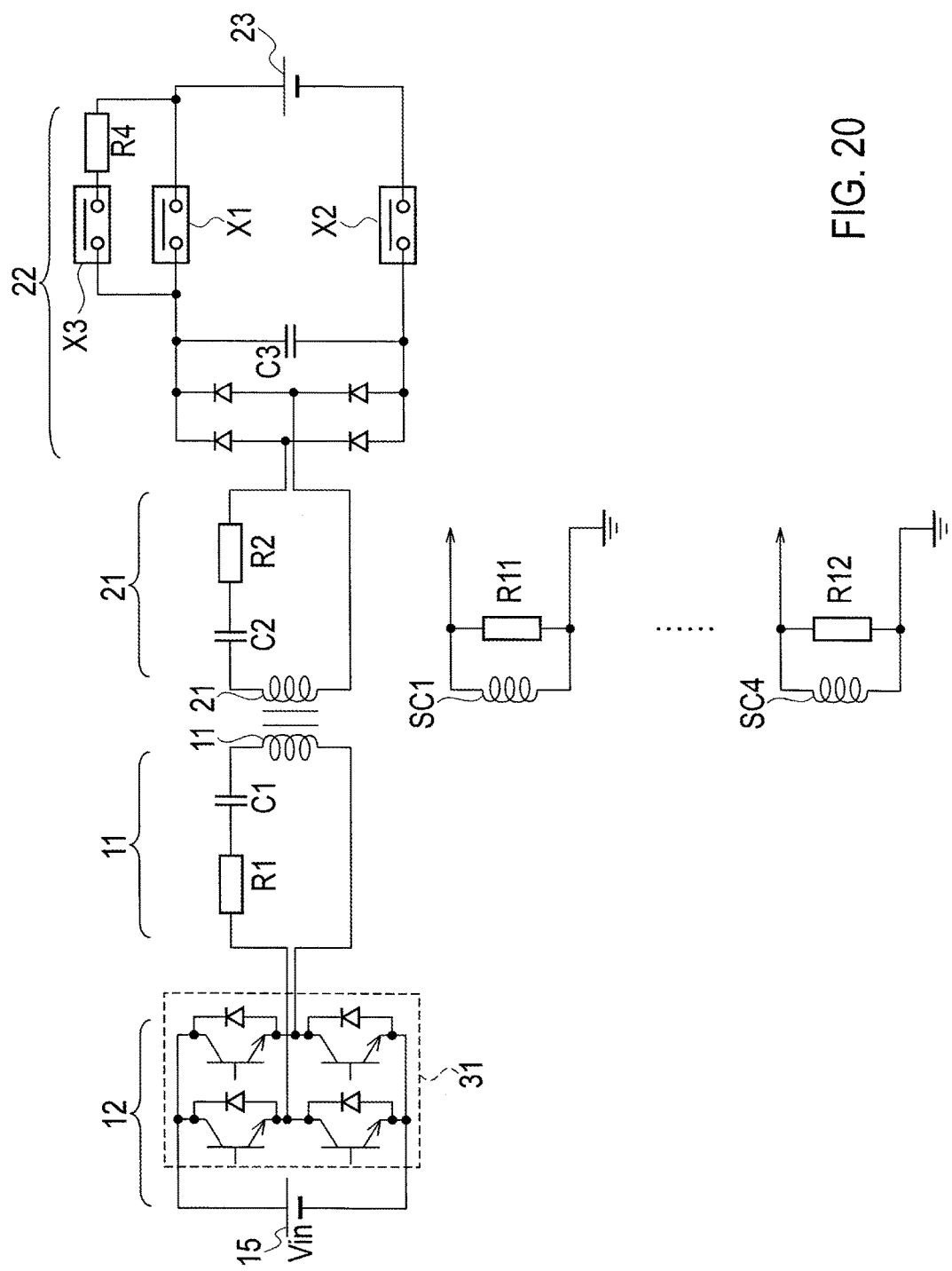
FIG. 20 is a circuit diagram of a power unit, a power transmission coil, a power reception coil, subcoils, and a rectification-smoothing circuit of the wireless power supply system according to the third embodiment of the present invention.

FIG. 20 is a circuit diagram showing detailed configurations of the power unit 12, the power transmission coil 11, the power reception coil 21, the subcoils SC1 to SC4, and the rectification-smoothing circuit 22 shown in FIG. 19 and peripheral elements thereof. The circuit diagram differs from the circuit diagram shown in FIG. 3 in that it includes the subcoils SC2 to SC4 in addition to the subcoil SC1. Note that the same parts in FIG. 20 as those in FIG. 3 will be denoted by the same reference signs, and description of their configurations will be omitted.

Figure 21:
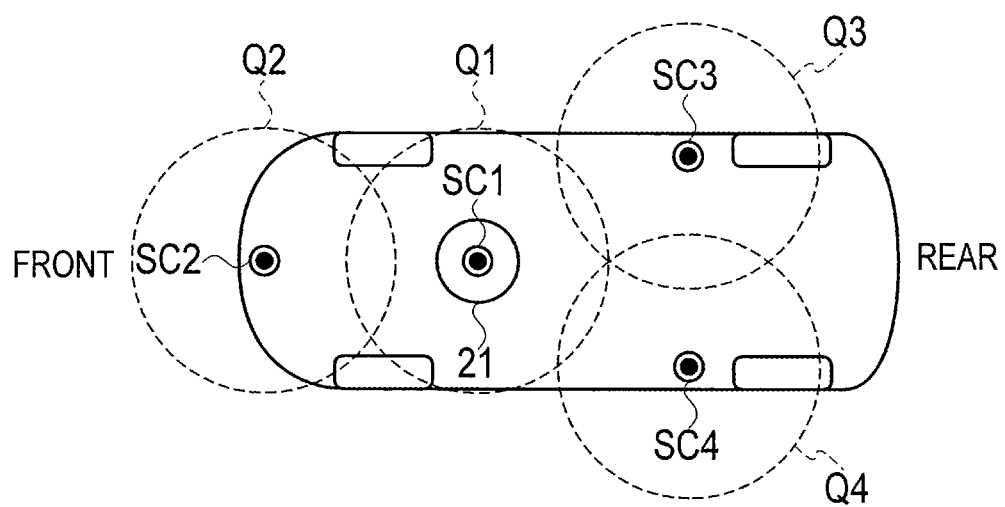
FIG. 21 is an explanatory diagram showing the arrangement of the power reception coil and the subcoils of the wireless power supply system according to the third embodiment of the present invention.

FIG. 21 is an explanatory diagram showing the arrangement of the power reception coil 21 and the subcoils SC1 to SC4, mounted at the bottom of the vehicle. As shown in FIG. 21, the subcoil SC2 is mounted at the bottom of the front side of the vehicle, and the two subcoils SC3, SC4 are provided at the bottom of the rear side of the vehicle. Moreover, each of the subcoils SC2 to SC4 is connected to the vehicle controller 24 (see FIG. 19) as in the subcoil SC1. The subcoils SC2 to SC4 function as peripheral subcoils provided around the power reception coil 21 and configured to receive power transmitted from the power transmission coil 11 without being affected by current flowing in the power reception coil 21.

Figure 22:
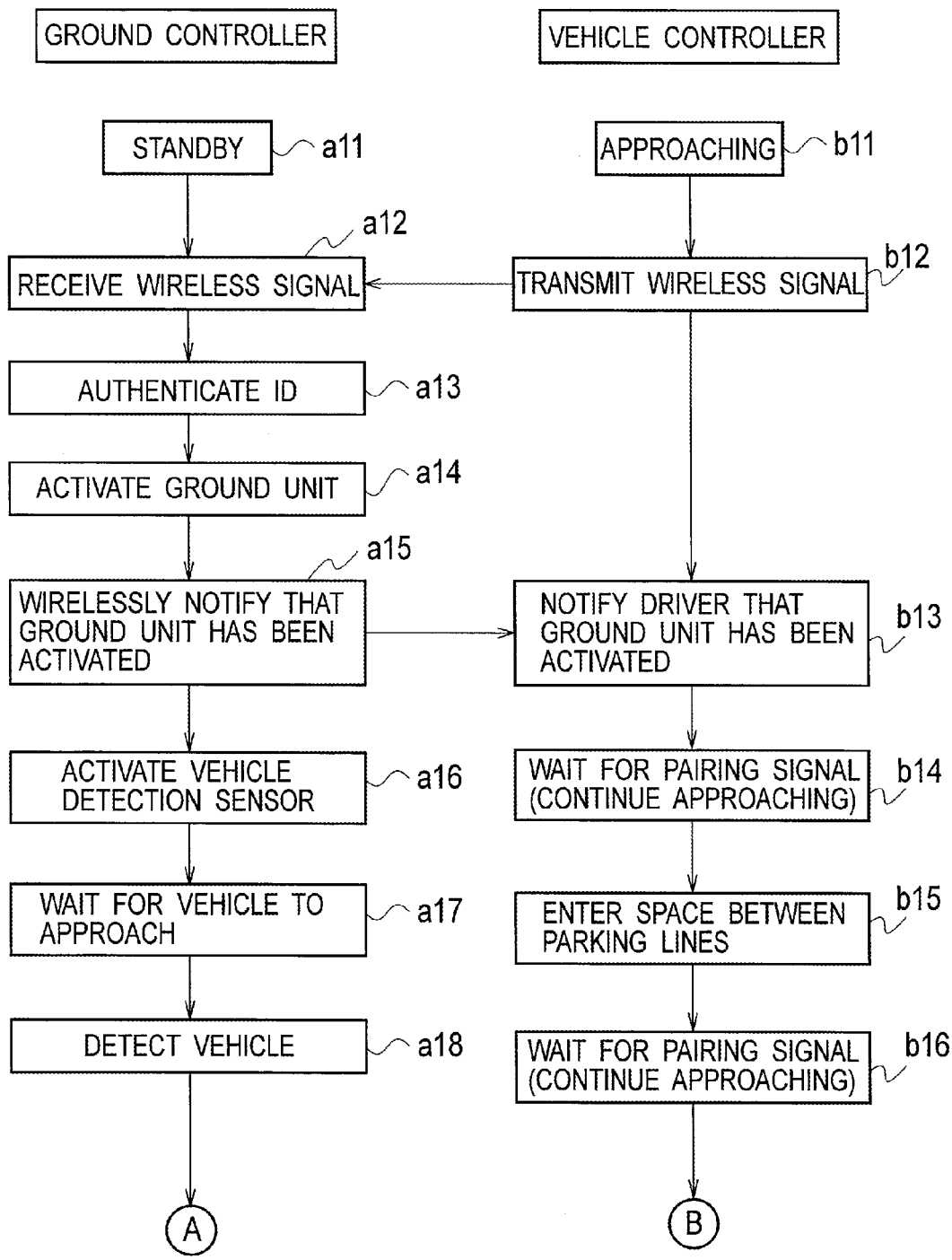
FIG. 22 is the first part of a flowchart showing the procedure of processing by the wireless power supply system according to the third embodiment of the present invention.

Next, the operation of the wireless power supply system according to the third embodiment will be described with reference to a flowchart shown in FIG. 22 and FIG. 23 and explanatory diagrams shown in FIG. 24 to FIG. 27. FIG. 24 shows a state where the vehicle 20 is approaching the inside of the parking space 32, which is situated between parking lines 34. In this state, the ground controller 13 is on standby (Step a11 in FIG. 22) and the vehicle controller 24 in approaching the parking space 32 (Step b11). Then, the vehicle controller 24 transmits a wireless signal containing a vehicle ID from the communication unit 25 through communication using a LAN (Local Area Network) or the like (Step b12).

Upon receipt of this wireless signal, the communication unit 14 of the ground unit 51 recognizes that the vehicle ID contained in the wireless signal is a valid vehicle ID (Step a13). Then, the ground unit 51 is activated (Step a14), and the vehicle controller 24 is notified with a wireless signal that the ground unit 51 has been activated (Step a15).

The vehicle controller 24 notifies the driver of the vehicle 20 that the ground unit 51 has been activated, for example, by displaying such information on the display (not shown) (Step b13). In this way, the driver can recognize that the ground unit 51 has been activated. The vehicle controller 24 waits for a pairing signal (Step b14).

After the ground unit 51 is activated, the ground controller 13 activates the vehicle detection sensor 33 (Step a16). The ground controller 13 waits for the vehicle 20 to approach (Step a17).

Figure 25:
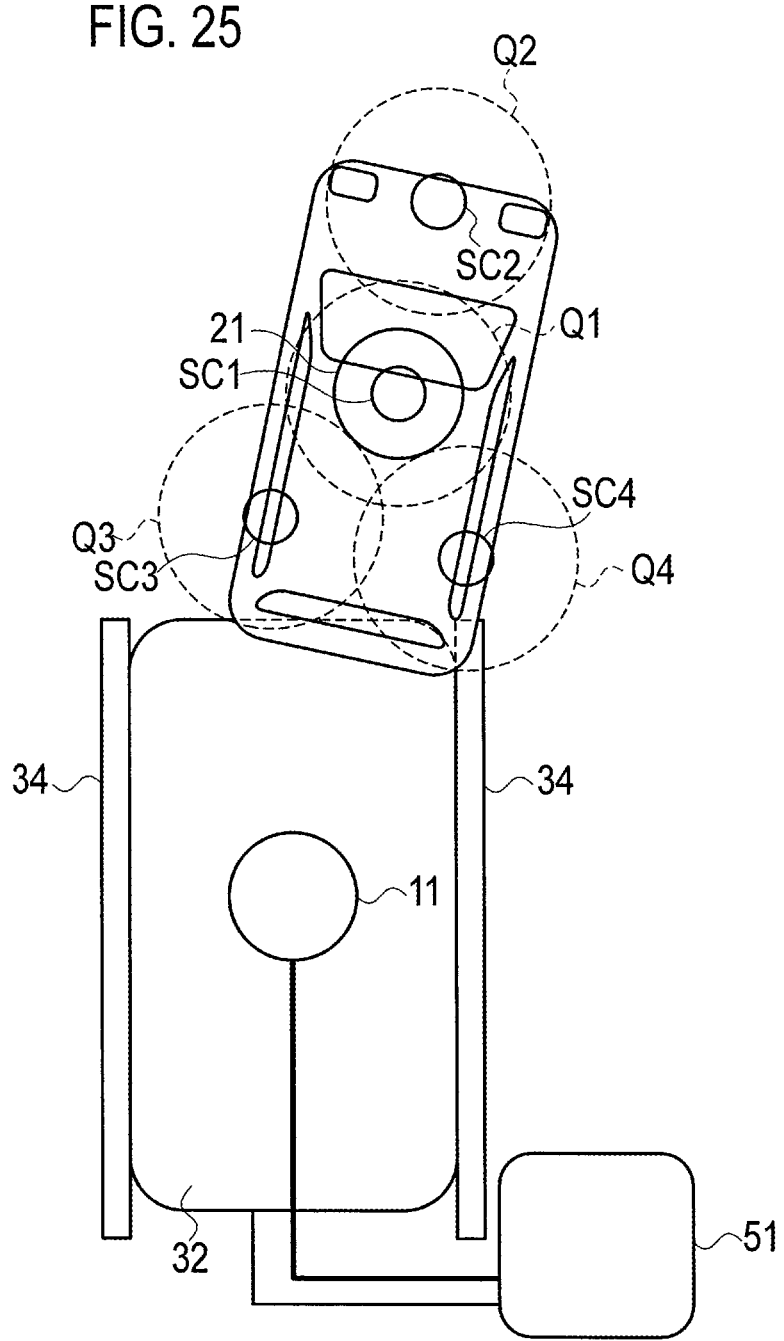
FIG. 25 is an explanatory diagram according to the third embodiment of the present invention showing a state where the vehicle is entering the parking space.

When part of the vehicle 20 then enters the parking space 32 between the parking lines 34 as shown in FIG. 25 (Step b15), the vehicle detection sensor 33 detects the entrance of the vehicle 20 into the parking space 32 (Step a18). The ground controller 13 excites the power transmission coil 11 in an excitation pattern containing a pairing signal. Specifically, the ground controller 13 sets the power transmission coil 11 to the above-mentioned first excitation to transmit a pairing signal (Step a19 in FIG. 23). Further, the ground controller 13 continues the first excitation (Step a20). At this point, the vehicle controller 24 is waiting for a pairing signal (Step b16).

Figure 23:
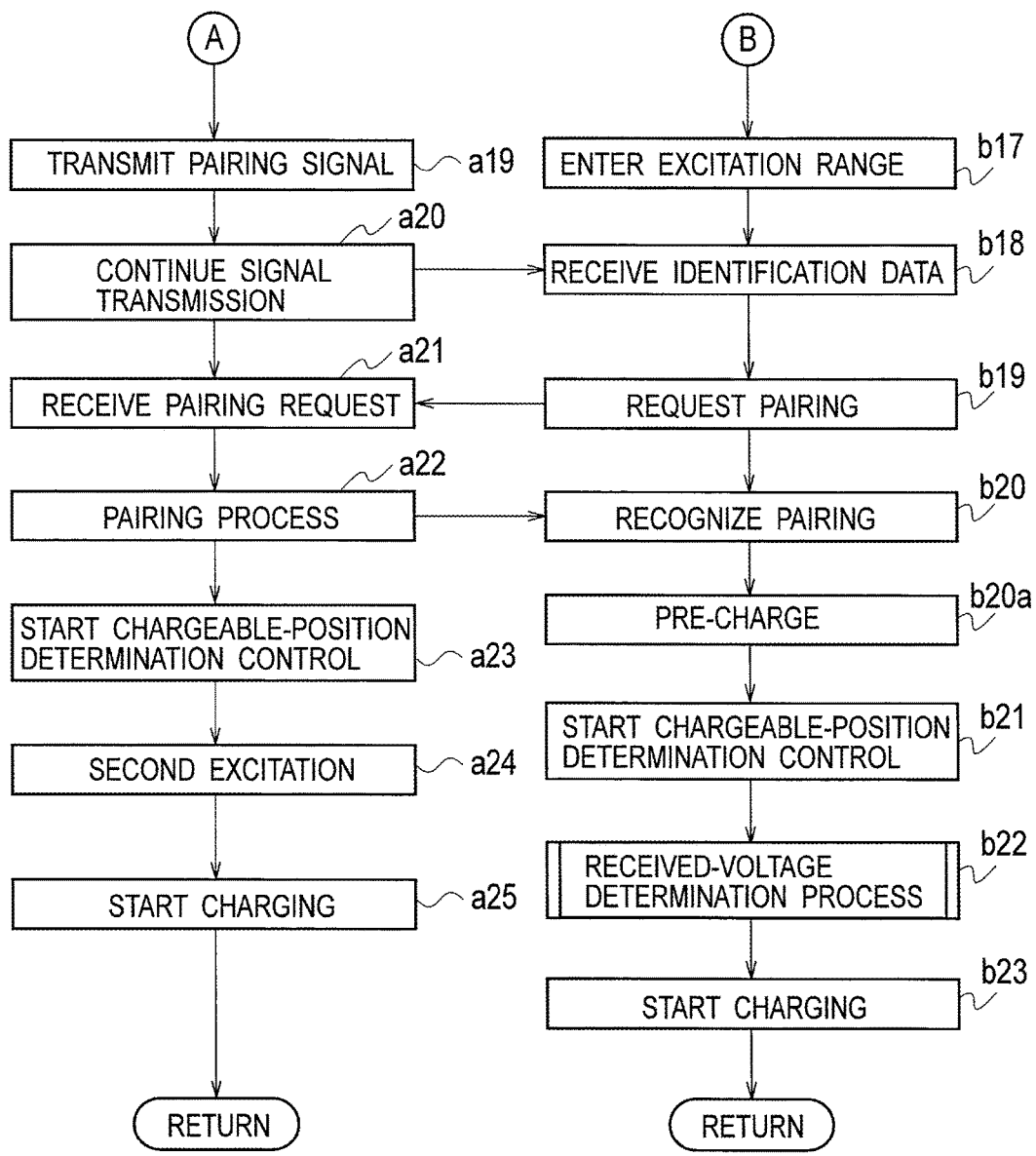
FIG. 23 is the second part of the flowchart showing the procedure of the processing by the wireless power supply system according to the third embodiment of the present invention.
Figure 24:
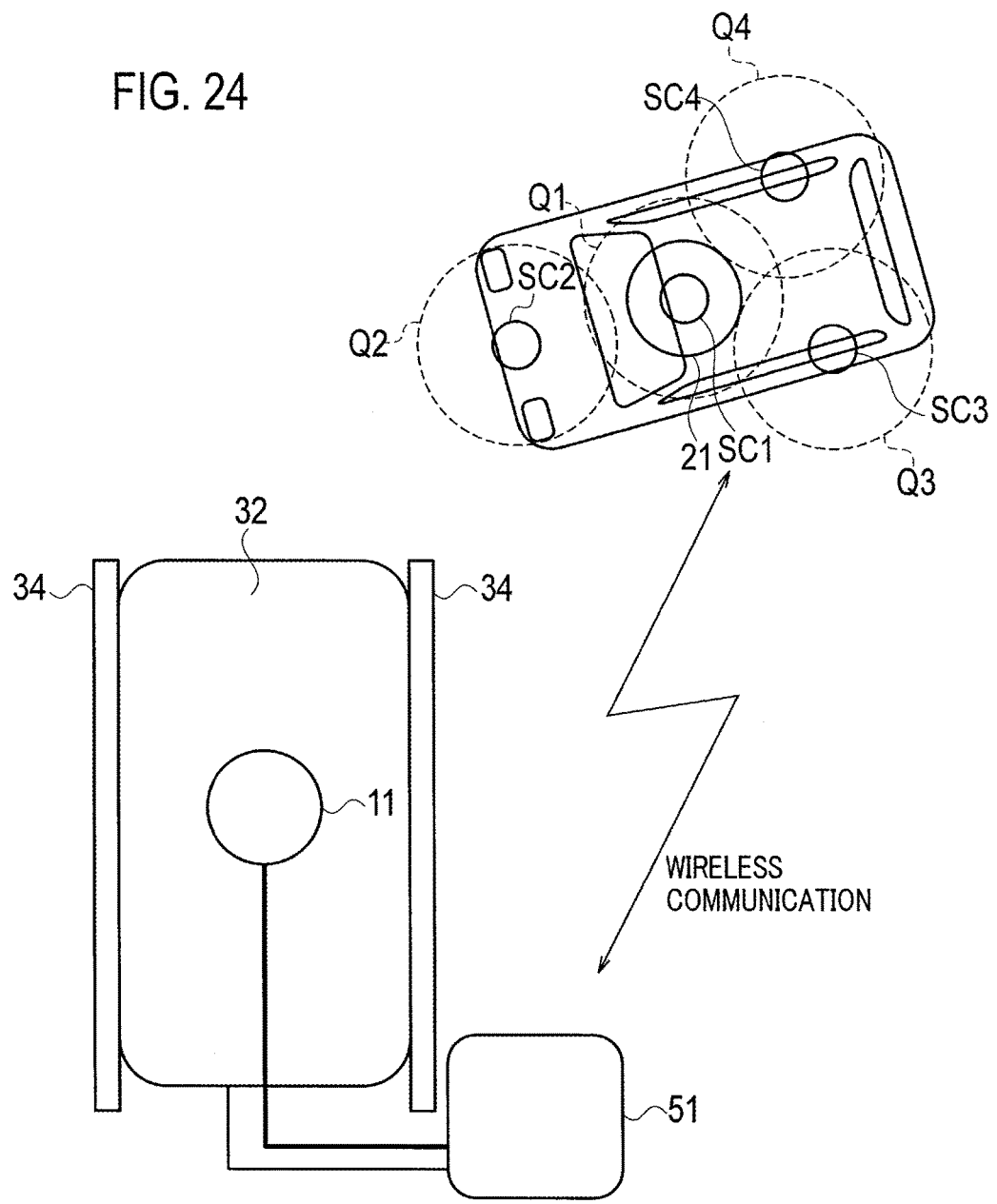
FIG. 24 is an explanatory diagram according to the third embodiment of the present invention showing a state where the vehicle is approaching one of parking spaces.
Figure 26:
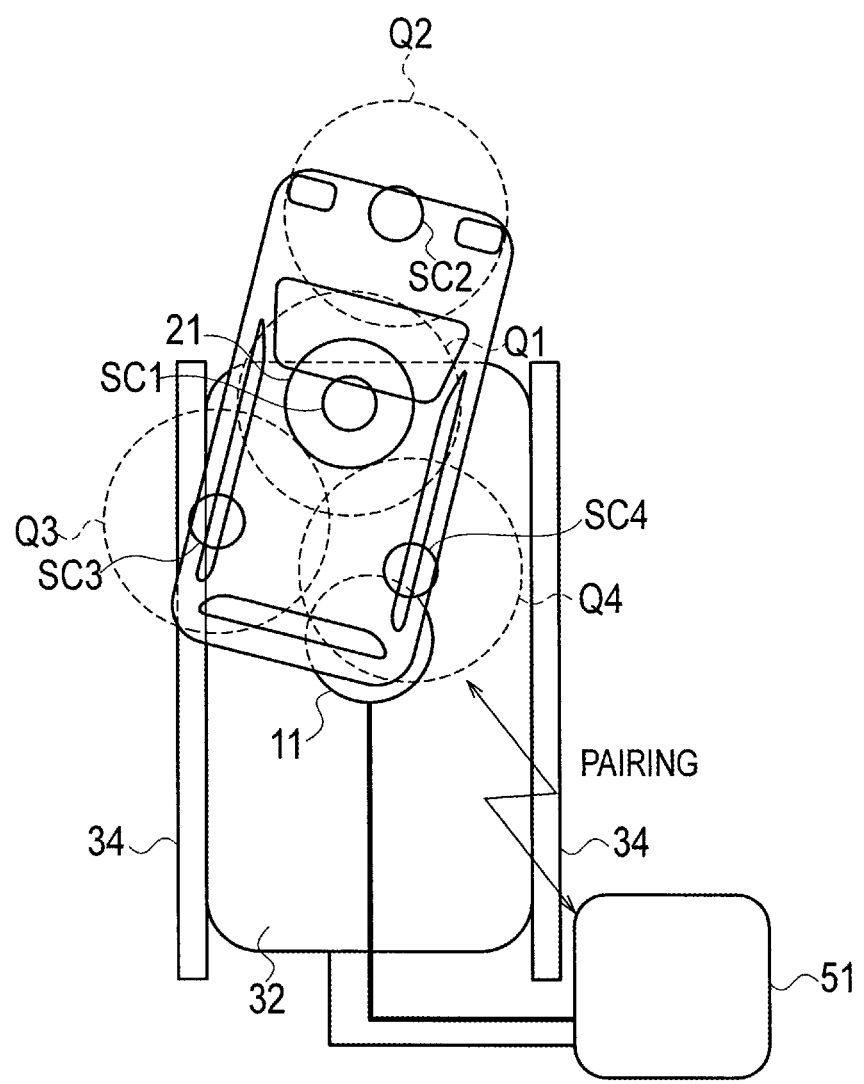
FIG. 26 is an explanatory diagram according to the third embodiment of the present invention showing a state where the vehicle has entered the parking space.

Then, as shown in FIG. 26, a signal receivable range Q4 of the subcoil SC4 enters the excitation range of the power transmission coil 11 as the vehicle 20 approaches the power transmission coil 11 in the parking space 32 and the signal receivable range Q4 reaches such a position as to overlap the excitation range of the power transmission coil 11 (Step b17 in FIG. 23). Thus, the subcoil SC4 receives a pairing signal, and the vehicle controller 24 recognizes the identification data contained in this pairing signal (Step b18).

The vehicle controller 24 transmits the recognized identification data through the communication unit 25 to request the ground controller 13 to perform pairing (Step b19). Upon receipt of the identification data (Step a21), the ground controller 13 determines whether or not the identification data contained in the pairing signal transmitted by the first excitation and the identification data transmitted from the vehicle controller 24 match each other. If they match each other, the power reception device 102 and the power transmission device 101 are paired with each other (Step a22).

In the pairing process, if a plurality of subcoils receive pairing signals, combined data is generated by combining the pieces of identification data contained in the pairing signals received by the subcoils. For example, if the two subcoils. SC3, SC4 receive pairing signals, the pieces of identification data contained in the pairing signals are ORed, and the result of the ORing is obtained as combined data. Then, it is determined whether or not this combined data and the identification data of the pairing signal transmitted from the power transmission coil 11 match each other.

This will be described with reference to waveform charts shown in FIG. 28. Part (a) of FIG. 28 is a waveform chart showing change in the voltage for the excitation of the power transmission coil 11. Part (b) of FIG. 28 is a waveform chart showing change in the voltage obtained by combining the voltages received by the two subcoils SC3, SC4. Part (c) of FIG. 28 is a waveform chart showing change in the voltage received by the subcoil SC1.

Assume for example that a pairing signal is transmitted from the power transmission coil 11 during a time period from a time t0 to a time t1, as shown in Part (a) of FIG. 28, and combined data is acquired from the two subcoils SC3, SC4, as shown in Part (b) of FIG. 28. In this case, it is determined whether or not the pairing signal and the combined data match each other. Then, if the identification data contained in the pairing signal transmitted from the power transmission coil 11 and the combined data from the two subcoils SC3, SC4 match each other, pairing is completed.

Thereafter, the ground controller 13 starts chargeable-position determination control (Step a23 in FIG. 23). After recognizing that pairing has been done (Step b20), the vehicle controller 24 turns on the relays X2, X3 shown in FIG. 20 and turns off the relay X1 shown in FIG. 20 to pre-charge the capacitor C3 (Step b20a). Then, the vehicle controller 24 starts chargeable-position determination control (Step b21).

The ground controller 13 controls the current flowing into the power transmission coil 11 such that the power transmission coil 11 can be set to the second excitation (Step a24). Then, the ground controller 13 shifts to charging of the battery 23 (Step a25). The vehicle controller 24 determines the level of the voltage received by the subcoil SC1, provided near the power reception coil 21 (Step b22). This received-voltage determination process is the same as the process shown in FIG. 14.

Specifically, as shown in Parts (a) to (c) of FIG. 28, when the pairing is completed at the time t1 and the power transmission coil 11 is then switched from the first excitation to the second excitation at a time t2, the combined voltage shown in Part (b) of FIG. 28 rises first. Then, as the vehicle 20 moves, the voltage received by the subcoil SC1 rises, as shown in Part (c) of FIG. 28. Thereafter, if the voltage received by the subcoil SC1 reaches the preset second threshold voltage Vth2, the vehicle 20 is determined to have reached the chargeable position.

Here, since the capacitor C3 has been pre-charged by the process in Step b20a in FIG. 23, the voltage received by the subcoil SC1 can be prevented from being supplied to the capacitor C3 in the received-voltage determination process in Step b22. Consequently, the voltage generated across the subcoil SC1 rises instantly, and the chargeable position can be determined quickly.

Figure 27:
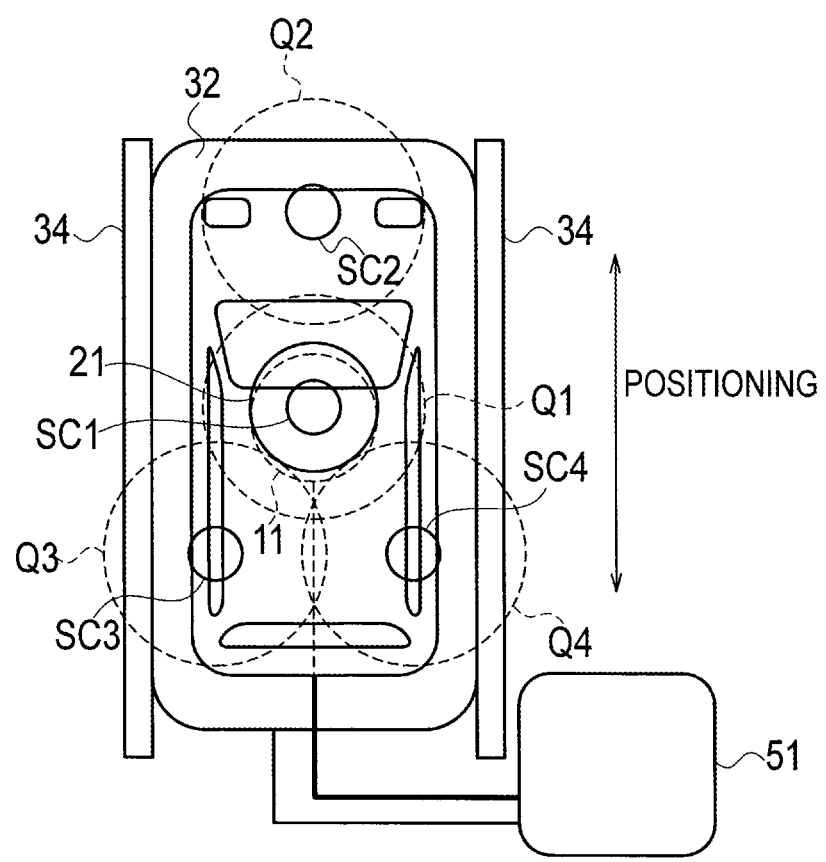
FIG. 27 is an explanatory diagram according to the third embodiment of the present invention showing a state where the vehicle is stopped at a predetermined position in the parking space.

Thereafter, charging of the battery 23 is started (Step b23) if the vehicle 20 is stopped at the predetermined position in the parking space 32, that is, if the vehicle 20 reaches such a position that the power transmission coil 11 and the power reception coil 21 face each other, as shown in FIG. 27.

As described above, in the wireless power supply system according to the third embodiment, the plurality of subcoils SC1 to SC4 are mounted at the bottom of the vehicle 20. Further, as the vehicle 20 approaches the parking space 32, the power transmission coil 11 is set to the first excitation and transmits a pairing signal. Furthermore, when at least one of the subcoils SC1 to SC4 receives this pairing signal, it is determined whether the identification data contained in this pairing signal and the identification data contained in the pairing signal transmitted from the power transmission coil 11 match each other. If they match each other, the power reception device 102 and the power transmission device 101 are paired with each other.

In this way, the vehicle 20 and the parking space 32 can be paired with each other before the vehicle 20 is stopped at the predetermined position in the parking space 32. Hence, it is possible to quickly shift to the operation of adjusting the charging position and the operation of charging the battery 23 after the pairing.

Also, the capacitor C3 is pre-charged. Thus, if the power transmission coil 11 is set to the second excitation, the level of the voltage received by the subcoil SC1 rises without being affected by the capacitor C3. Hence, whether or not the vehicle 20 is stopped at a chargeable position can be determined quickly.

Also, the pre-charging is performed after the completion of the pairing. Hence, unnecessary pre-charging is prevented if the pairing is completed but the driver moves the vehicle 20 out of the parking space 32 for some reason.

Although the wireless power supply system and the wireless power reception device of the present invention have been described based on the illustrated embodiment, the present invention is not limited to those. The configuration of each part can be replaced with any configuration having a similar function.

For example, in the above-described embodiment, the description has been given of the example where the battery 23 is the electric load. However, the present invention is not limited to this example. For instance, an electric motor can be the electric load.

REFERENCE SIGNS LIST 11, 11a power transmission coil
12 power unit
13 ground controller
14 communication unit
15 dc power source
20 vehicle
21 power reception coil
22 rectification-smoothing circuit
23 battery
24 vehicle controller
25 communication unit
31 inverter circuit
32, 32a parking space
33, 33a vehicle detection sensor
51, 51a ground unit
61 ferrite core
101, 101a power transmission device
102 power reception device

The invention claimed is:

1. A wireless power supply system comprising:
at least one power transmission device provided on a ground and configured to transmit power; and
a power reception device provided to a vehicle and configured to receive power transmitted from the at least one power transmission device and supply the power to an electric load,
wherein the at least one power transmission device includes
a power transmission coil provided at a parking space and configured to transmit power,
a ground controller configured to control power to be supplied to the power transmission coil, and
a power-transmission-side wireless device configured to communicate with the power reception device,
the power reception device includes
a power reception coil configured to receive power transmitted from the power transmission coil and supply the received power to the electric load through a capacitor,
a vehicle controller configured to control power reception of the power reception coil, and
a power-reception-side wireless device configured to communicate with the at least one power transmission device,
when the vehicle approaches the parking space, the ground controller sets the power transmission coil to a first excitation in which the power transmission coil is excited in an excitation pattern containing identification data,
the vehicle controller
pre-charges the capacitor after the vehicle approaches the parking space before the power transmission coil is set to the first excitation,
acquires the identification data when the power transmission coil is in the first excitation, and
transmits the acquired identification data to the at least one power transmission device, and
the ground controller pairs the at least one power transmission device and the power reception device with each other when the identification data contained in the excitation pattern and the identification data acquired by the vehicle controller match each other.

2. The wireless power supply system according to claim 1, wherein when the power transmission coil is in the first excitation, the vehicle controller acquires the identification data from power received by the power reception coil.

3. The wireless power supply system according to claim 1,
wherein the power reception device further includes a central subcoil that is provided near the power reception coil and configured to receive power transmitted from the power transmission coil, and
when the power transmission coil is in the first excitation, the vehicle controller acquires the identification data from the power received by the central subcoil.

4. The wireless power supply system according to claim 3, wherein
the power reception device further includes at least one peripheral subcoil that is provided around the power reception coil and configured to receive power transmitted from the power transmission coil without being affected by current flowing in the power reception coil,
when the power transmission coil is in the first excitation, the vehicle controller acquires the identification data from the power received by the at least one peripheral subcoil and transmits the acquired identification data to the at least one power transmission device,
when the identification data contained in the excitation pattern and the identification data received by the at least one peripheral subcoil match each other, the ground controller pairs the at least one power transmission device and the power reception device with each other, and then sets the power transmission coil to a second excitation for determining whether or not the vehicle is present at a chargeable position in the parking space, and
the vehicle controller determines whether or not the vehicle is present at the chargeable position in the parking space, from the power received by the central subcoil.

5. The wireless power supply system according to claim 1, wherein the identification data comprises a vehicle ID of the vehicle.

6. A wireless power reception device provided to a vehicle and configured to wirelessly receive power transmitted from a power transmission device provided on a ground, the wireless power reception device comprising:
a power reception coil configured to receive power transmitted from the power transmission device and supply the received power to an electric load through a capacitor,
a vehicle controller configured to control power reception of the power reception coil, and a power-reception-side wireless device configured to communicate with the power transmission device, wherein the vehicle controller pre-charges the capacitor after the vehicle approaches a parking space, acquires identification data when a power transmission coil provided to the power transmission device is set to a first excitation in which the power transmission coil is excited in an excitation pattern containing the identification data, and transmits the acquired identification data to the power transmission device, wherein the vehicle controller pre-charges the capacitor before receiving the identification data.

7. The wireless power reception device according to claim 6, wherein when the power transmission coil is in the first excitation, the vehicle controller acquires the identification data from power received by the power reception coil.

8. The wireless power reception device according to claim 6, further comprising a central subcoil provided near the power reception coil and configured to receive power transmitted from the power transmission coil, wherein
when the power transmission coil is in the first excitation, the vehicle controller acquires the identification data from the power received by the central subcoil.

9. The wireless power reception device according to claim 8, further comprising at least one peripheral subcoil provided around the power reception coil and configured to receive power transmitted from the power transmission coil without being affected by current flowing in the power reception coil, wherein when the power transmission coil is in the first excitation, the vehicle controller acquires the identification data from the power received by the at least one peripheral subcoil and transmits the acquired identification data to the power transmission device, and when the power transmission coil is in second excitation for determining whether or not the vehicle is present at a chargeable position in the parking space, the vehicle controller determines whether or not the vehicle is present at the chargeable position in the parking space, from voltage received by the central subcoil.

10. The wireless power reception device according to claim 6, wherein the identification data comprises a vehicle ID of the vehicle.

* * * * *